United States Patent [19]
Lewis

[11] Patent Number: 5,956,265
[45] Date of Patent: Sep. 21, 1999

[54] BOOLEAN DIGITAL MULTIPLIER

[76] Inventor: James M. Lewis, 11405 Alabama Highway 23, Moulton, Ala. 35650

[21] Appl. No.: 08/863,588

[22] Filed: May 27, 1997

Related U.S. Application Data

[60] Provisional application No. 60/019,289, Jun. 7, 1996.
[51] Int. Cl.$^6$ .................................................. G06F 7/52
[52] U.S. Cl. ................................................................ 364/757
[58] Field of Search ........................ 364/716.03, 754.01, 364/757, 758, 759

[56] References Cited

U.S. PATENT DOCUMENTS

| | | | |
|---|---|---|---|
| 3,610,906 | 10/1971 | Stampler | 364/757 |
| 3,610,907 | 10/1971 | Taylor | 235/164 |
| 3,617,723 | 11/1971 | Melvin | 235/164 |
| 3,805,037 | 4/1974 | Ellison | 235/152 |
| 3,914,589 | 10/1975 | Gaskill, Jr. et al. | 235/164 |
| 4,013,879 | 3/1977 | Bornmann et al. | 235/164 |
| 4,086,657 | 4/1978 | Gaskill, Jr. et al. | 364/757 |
| 4,130,877 | 12/1978 | Riekers | 364/758 |
| 4,130,878 | 12/1978 | Balph et al. | 364/758 |
| 4,190,894 | 2/1980 | Mudge | 364/758 |
| 4,216,531 | 8/1980 | Chiu | 364/757 |
| 4,251,875 | 2/1981 | Marver et al. | 364/754 |
| 4,941,121 | 7/1990 | Zurawski | 364/757 |
| 4,967,107 | 10/1990 | Kaplinski | 307/465 |
| 5,175,862 | 12/1992 | Phelps et al. | 395/800 |
| 5,438,533 | 8/1995 | Yoshida | 364/746.2 |

*Primary Examiner*—Chuong Dinh Ngo
*Attorney, Agent, or Firm*—Aquilino & Welsh

[57] ABSTRACT

A boolean multiplier is disclosed. The boolean multiplier includes a plurality of input buffers for storing a first operand and a second operand. The multiplier also includes a first set of gates coupled to the input buffers, the first set of gates respectively combining the first operand and the second operand with Boolean function to produce logical products. The multiplier further includes a second set of gates coupled to the first set of gates, the second set of gates respectively combining the logical products with Boolean functions to produce specific product bits.

20 Claims, 23 Drawing Sheets

| Array Description | Transistor Non-pipelined | Transistors Pipelined | Speed | Power Dissipation |
|---|---|---|---|---|
| Agrawal Multiplier/divider | 4025 | 7175 | * | * |
| Noll | * | 5480 | 330 MHz | 1.5 W |
| Somasekhar and Visvanatham | * | 5176 | 230 MHz | .540 W |

* Insufficient data in reference

$$
\begin{array}{ccccccc}
 & & & & & y_1 & y_0 \\
 & & y_{m-1} & \cdots & y_2 & x_1 & x_0 \\
\hline
 & & \overline{x_0 y_{m-1}} & x_0 y_{m-2} & x_0 y_2 & x_0 y_1 & x_0 y_0 \\
 & \overline{x_1 y_{m-1}} & x_1 y_{m-2} & \cdots & x_1 y_1 & x_1 y_0 & \\
 & \cdot & & & & & \\
 & \cdot & & & & & \\
 & \cdot & & & & & \\
x_{n-1} y_{m-1} & \overline{x_{n-1} y_{m-2}} & \cdots & x_{n-1} \overline{y_2} & x_{n-1} \overline{y_1} & \overline{x_{n-1} y_0} & \\
\overline{x_{n-1}} & & & & & x_{n-1} & \\
1 & \overline{y_{m-1}} & & & y_{m-1} & & \\
\hline
p_{n+m-1} p_{n+m-2} & p_{m-1} & \cdots & p_n & p_{n-1} & p_{n-2} \cdots p_2 & p_1 & p_0
\end{array}
$$

FIG. 3

|  |  |  |  |  | $y_{m-1}$ | ... | $y_2$ | $y_1$ | $y_0$ |
|  |  |  |  |  |  |  |  | $x_{n-1}$ ... $x_1$ | $x_0$ |
|  |  |  |  | $\overline{x_0 y_{m-1}}$ | $x_0 y_{m-2}$ | ... | $x_0 y_2$ | $x_0 y_1$ | $x_0 y_0$ |
|  |  |  | $\overline{x_1 y_{m-1}}$ | $x_1 y_{m-2}$ | ... | $x_1 y_2$ | $x_1 y_1$ | $x_1 y_0$ |
|  |  | . | . |  |  |  |  |  |  |
|  | $\overline{x_{n-1} y_{m-1}}$ | $x_{n-1} y_{m-2}$ | ... | $x_{n-1} y_2$ | $x_{n-1} y_1$ | $\overline{x_{n-1} y_0}$ |  |  |  |
| 1 |  |  |  |  |  |  |  |  |  |
| $p_{n+m-1}$ $p_{n+m-2}$ | ... | $p_{m-1}$ | ... | $p_n$ | $p_{n-1}$ | $p_{n-2}$ | ... | $p_2$ | $p_1$ | $p_0$ |

FIG. 4

$$
\begin{array}{cccccccc}
 & & & & & & y_{n-1} & \cdots & y_2 & y_1 & y_0 \\
 & & & & & & x_{n-1} & \cdots & x_2 & x_1 & x_0 \\
\hline
 & & & & & \overline{x_0 y_{n-1}} & x_0 y_{n-2} & \cdots & x_0 y_2 & x_0 y_1 & x_0 y_0 \\
 & & & & \overline{x_1 y_{m-1}} & x_1 y_{n-2} & \cdots & & x_1 y_2 & x_1 y_1 & x_1 y_0 \\
 & & & \cdot & \cdot & \cdot & & & & & \\
 & \overline{x_{n-1} y_{n-1}} & \overline{x_{n-1} y_{n-2}} & \cdots & \overline{x_{n-1} y_1} & \overline{x_{n-1} y_0} & & & & & \\
\hline
1 & & & & 1 & & & & & & \\
\hline
p_{2n-1} & p_{2n-2} & \cdots & p_n & p_{n-1} & p_{n-2} & \cdots & p_2 & p_1 & p_0
\end{array}
$$

FIG. 5

$$\begin{array}{r}9\\ \times\ 9\\ \hline 81\end{array} \qquad \begin{array}{r}99\\ \times\ 99\\ \hline 9{,}801\end{array} \qquad \begin{array}{r}999\\ \times\ 999\\ \hline 998{,}001\end{array} \qquad \begin{array}{r}999{,}999\\ \times\ 999{,}999\\ \hline 999{,}998{,}000{,}001\end{array}$$

A. Base 10 Examples $$\begin{array}{r}4\\ \times\ 4\\ \hline 31_5\ (16_{10})\end{array} \qquad \begin{array}{r}44_5\\ \times\ 44_5\\ \hline 4301_5\end{array}\ \begin{array}{c}(24_{10})\\ \\ (576_{10})\end{array} \qquad \begin{array}{r}4444_5\\ \times\ 4444_5\\ \hline 44430001\end{array}\ \begin{array}{c}(624_{10})\\ \\ (389{,}376_{10})\end{array}$$

B. Base 5 Examples $$\begin{array}{r}7\\ \times\ 7\\ \hline 61_8\ (49_{10})\end{array} \qquad \begin{array}{r}77_8\\ \times\ 77_8\\ \hline 7601_8\end{array}\ \begin{array}{c}(63_{10})\\ \\ (3{,}969_{10})\end{array} \qquad \begin{array}{r}7777_8\\ \times\ 7777_8\\ \hline 77760001_8\end{array}\ \begin{array}{c}(4095_{10})\\ \\ (16{,}769{,}025_{10})\end{array}$$

C. Base 8 Examples $$\begin{array}{r}1\\ \times\ 1\\ \hline 01\ (1_{10})\end{array} \qquad \begin{array}{r}11_2\\ \times\ 11_2\\ \hline 1001_2\end{array}\ \begin{array}{c}(3_{10})\\ \\ (9_{10})\end{array} \qquad \begin{array}{r}111111_2\\ \times\ 111111_2\\ \hline 111110000001_2\end{array}\ \begin{array}{c}(63_{10})\\ \\ (3{,}969_{10})\end{array}$$

D. Base 2 Examples

FIG. 8

```
      0111001000           ° ° ° ° ° ° ° ° ° °   Operand A
    X 0001111011           ° ° ° ° ° ° ° ° ° °   Operand B
      ──────────
      0111001000           ° ° ° ° ° ° ° ° ° °   First Partial
     0111001000            ° ° ° ° ° ° ° ° ° °   Product
    0000000000             ° ° ° ° ° ° ° ° ° °
   0111001000              ° ° ° ° ° ° ° ° ° °
  0111001000               ° ° ° ° ° ° ° ° ° °   Intermediate Terms
 0111001000                ° ° ° ° ° ° ° ° ° °   or Partial Products
0111001000                 ° ° ° ° ° ° ° ° ° °
0000000000                 ° ° ° ° ° ° ° ° ° °
0000000000                 ° ° ° ° ° ° ° ° ° °
0000000000                 ° ° ° ° ° ° ° ° ° °
──────────────────────
00001101101100011000       ° ° ° ° ° ° ° ° ° ° ° ° ° ° ° ° ° °   Final
                                                                 Product
```

| | | | | | 0 | 1 | 3 | 2 | 6 | 7 | 5 | 4 | 12 | 13 | 15 | 14 | 10 | 11 | 9 | 8 |
|---|---|---|---|---|---|---|---|---|---|---|---|---|---|---|---|---|---|---|---|---|
| | | | | | 0 | 0 | 0 | 0 | 0 | 0 | 0 | 0 | 1 | 1 | 1 | 1 | 1 | 1 | 1 | 1 |
| | | | | | 0 | 0 | 0 | 0 | 1 | 1 | 1 | 1 | 1 | 1 | 1 | 1 | 0 | 0 | 0 | 0 |
| | | | | | 0 | 0 | 1 | 1 | 1 | 1 | 0 | 0 | 0 | 0 | 1 | 1 | 1 | 1 | 0 | 0 |
| | | | | | 0 | 1 | 1 | 0 | 0 | 1 | 1 | 0 | 0 | 1 | 1 | 0 | 0 | 1 | 1 | 0 |
| 0 | 0 | 0 | 0 | 0 | | | | | | | | | | | | | | | | |
| 1 | 0 | 0 | 0 | 1 | | | | | | | | | 1 | 1 | 1 | 1 | 1 | 1 | 1 | 1 |
| 3 | 0 | 0 | 1 | 1 | | 1 | | | 1 | 1 | | | 1 | 1 | 1 | | | 1 | 1 | |
| 2 | 0 | 0 | 1 | 0 | | | | 1 | 1 | 1 | 1 | 1 | 1 | 1 | 1 | | | | | |
| 6 | 0 | 1 | 1 | 0 | | | 1 | | 1 | 1 | 1 | 1 | 1 | | 1 | | | | | |
| 7 | 0 | 1 | 1 | 1 | | | | 1 | 1 | | 1 | | 1 | 1 | | | 1 | 1 | 1 | |
| 5 | 0 | 1 | 0 | 1 | | 1 | 1 | 1 | | 1 | | 1 | | 1 | | | | 1 | 1 | |
| 4 | 0 | 1 | 0 | 0 | | 1 | 1 | 1 | | | | | 1 | 1 | 1 | | | | | |
| 1 | 1 | 1 | 0 | 0 | 1 | | 1 | 1 | | 1 | | | 1 | 1 | | 1 | | | | |
| 1 | 1 | 1 | 0 | 1 | 1 | | 1 | 1 | 1 | | 1 | 1 | | | | | 1 | | 1 | |
| 1 | 1 | 1 | 1 | 1 | 1 | 1 | 1 | 1 | 1 | 1 | | | | | | | | | 1 | |
| 1 | 1 | 1 | 1 | 0 | 1 | 1 | 1 | | | 1 | 1 | | | | | 1 | 1 | 1 | | |
| 1 | 1 | 0 | 1 | 0 | 1 | 1 | | 1 | | | 1 | 1 | | | 1 | | 1 | 1 | | |
| 1 | 1 | 0 | 1 | 1 | 1 | | | 1 | | 1 | | 1 | | 1 | | 1 | 1 | | 1 | |
| 9 | 1 | 0 | 0 | 1 | 1 | 1 | | | 1 | 1 | | 1 | | | 1 | 1 | | | 1 | |
| 8 | 1 | 0 | 0 | 0 | 1 | 1 | | | 1 | 1 | | | 1 | 1 | | | 1 | 1 | | |

FIG. 20

| | | 0 | 2 | 6 | 4 | 12 | 14 | 10 | 8 | 9 | 11 | 15 | 13 | 5 | 7 | 3 | 1 |
|---|---|---|---|---|---|---|---|---|---|---|---|---|---|---|---|---|---|
| | | 0 | 0 | 0 | 0 | 1 | 1 | 1 | 1 | 1 | 1 | 1 | 1 | 0 | 0 | 0 | 0 |
| | | 0 | 0 | 1 | 1 | 1 | 1 | 0 | 0 | 0 | 0 | 1 | 1 | 1 | 1 | 0 | 0 |
| | | 0 | 1 | 1 | 0 | 0 | 1 | 1 | 0 | 0 | 1 | 1 | 0 | 0 | 1 | 1 | 0 |
| | | 0 | 0 | 0 | 0 | 0 | 0 | 0 | 0 | 1 | 1 | 1 | 1 | 1 | 1 | 1 | 1 |
| 0 | 0 0 0 0 | | | | | | | | | | | | | | | | |
| 2 | 0 0 1 0 | | | | | 1 | 1 | 1 | 1 | 1 | 1 | 1 | 1 | | | | |
| 6 | 0 1 1 0 | | | | 1 | | 1 | 1 | 1 | | 1 | | 1 | | | 1 | |
| 4 | 0 1 0 0 | | | 1 | 1 | 1 | 1 | | | | | 1 | 1 | 1 | | | |
| 12 | 1 1 0 0 | 1 | | 1 | 1 | | 1 | | | | | 1 | 1 | 1 | | | |
| 14 | 1 1 1 0 | 1 | 1 | | | | | 1 | 1 | 1 | 1 | | | | | | |
| 10 | 1 0 1 0 | 1 | 1 | | 1 | | 1 | | 1 | | 1 | | | | 1 | | |
| 8 | 1 0 0 0 | 1 | 1 | | | 1 | 1 | | | 1 | 1 | | | | 1 | 1 | |
| 9 | 1 0 0 1 | 1 | 1 | | | 1 | 1 | 1 | | | 1 | | | 1 | | 1 | 1 |
| 11 | 1 0 1 1 | 1 | | | | | 1 | | 1 | | | 1 | | | 1 | | |
| 15 | 1 1 1 1 | 1 | 1 | 1 | 1 | 1 | 1 | 1 | | | | | | | | | |
| 13 | 1 1 0 1 | 1 | | 1 | 1 | | | | 1 | | | | | 1 | | | |
| 5 | 0 1 0 1 | | | 1 | 1 | 1 | | 1 | | | 1 | | 1 | | | | |
| 7 | 0 1 1 1 | | | 1 | 1 | | | | 1 | 1 | | | 1 | | 1 | 1 | |
| 3 | 0 0 1 1 | | 1 | | | | 1 | 1 | 1 | | | | | | 1 | | |
| 1 | 0 0 0 1 | | | | | | | | | | | | | | | | |

FIG. 21

| P-5 | | | | | 0 | 1 | 3 | 2 | 6 | 7 | 5 | 4 | -4 | -3 | -1 | -2 | -6 | -5 | -7 | -8 |
|---|---|---|---|---|---|---|---|---|---|---|---|---|---|---|---|---|---|---|---|---|
| | | | | | 0 | 0 | 0 | 0 | 0 | 0 | 0 | 0 | 1 | 1 | 1 | 1 | 1 | 1 | 1 | 1 |
| | | | | | 0 | 0 | 0 | 0 | 1 | 1 | 1 | 1 | 1 | 1 | 1 | 1 | 0 | 0 | 0 | 0 |
| | | | | | 0 | 0 | 1 | 1 | 1 | 1 | 0 | 0 | 0 | 0 | 1 | 1 | 1 | 1 | 0 | 0 |
| | | | | | 0 | 1 | 1 | 0 | 0 | 1 | 1 | 0 | 0 | 1 | 1 | 0 | 0 | 1 | 1 | 0 |
| 0 | 0 | 0 | 0 | 0 | | | | | | | | | | | | | | | | |
| 1 | 0 | 0 | 0 | 1 | | | | | | | | | 1 | 1 | 1 | 1 | 1 | 1 | 1 | 1 |
| 3 | 0 | 0 | 1 | 1 | | | | | | | | | 1 | 1 | 1 | 1 | 1 | 1 | 1 | 1 |
| 2 | 0 | 0 | 1 | 0 | | | | | | | | | 1 | 1 | 1 | 1 | 1 | 1 | 1 | 1 |
| 6 | 0 | 1 | 1 | 0 | | | | | 1 | 1 | | | 1 | 1 | 1 | 1 | | 1 | | |
| 7 | 0 | 1 | 1 | 1 | | | | | 1 | 1 | 1 | | 1 | 1 | 1 | 1 | | | | |
| 5 | 0 | 1 | 0 | 1 | | | | | | 1 | | | 1 | 1 | 1 | 1 | 1 | 1 | | |
| 4 | 0 | 1 | 0 | 0 | | | | | | | | | 1 | 1 | 1 | 1 | 1 | 1 | 1 | 1 |
| -4 | 1 | 1 | 0 | 0 | | | | | 1 | 1 | 1 | 1 | 1 | 1 | | | | | | 1 |
| -3 | 1 | 1 | 0 | 1 | | | | | 1 | 1 | 1 | 1 | 1 | 1 | 1 | | | | | |
| -1 | 1 | 1 | 1 | 1 | | | | | 1 | 1 | 1 | 1 | 1 | 1 | 1 | | | | | |
| -2 | 1 | 1 | 1 | 0 | | | | | 1 | 1 | 1 | 1 | 1 | 1 | 1 | | | | | |
| -6 | 1 | 0 | 1 | 0 | | | | | 1 | 1 | 1 | | 1 | 1 | | | 1 | | 1 | 1 |
| -5 | 1 | 0 | 1 | 1 | | | | | 1 | 1 | 1 | 1 | 1 | 1 | | | | | 1 | 1 |
| -7 | 1 | 0 | 0 | 1 | | | | | 1 | 1 | 1 | | 1 | | | | 1 | 1 | 1 | 1 |
| -8 | 1 | 0 | 0 | 0 | | | | | 1 | 1 | 1 | | | 1 | 1 | | 1 | 1 | 1 | |

| Design | Transistors | Gate Delay | Gates per Cycle | Latency (cycles) |
|---|---|---|---|---|
| 2-Level Boolean | 4156 | 2 | 2 | 1 |
| 3-Level Boolean | 2864 | 3 | 3 | 1 |
| Noll * | 1370 | ≥16 | 4 | 5 |
| Somasekar and Visvanathan * | 1264 | ≥16 | 4 | 3 |
* Data is estimated from 8-bit designs
FIG. 23
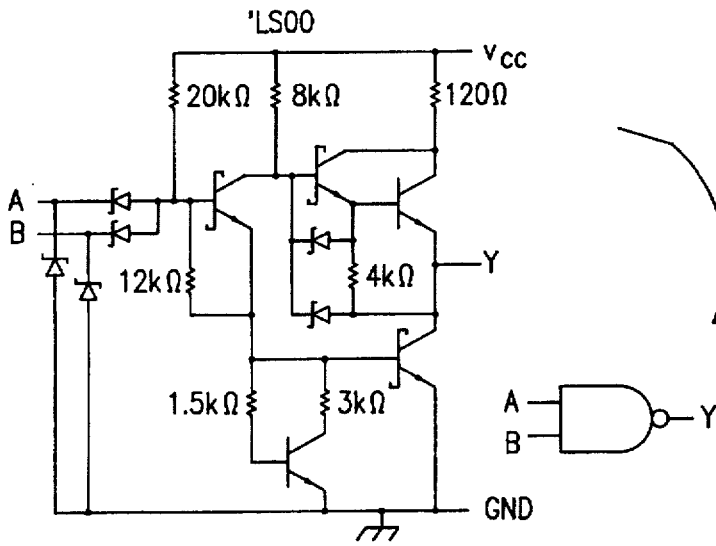
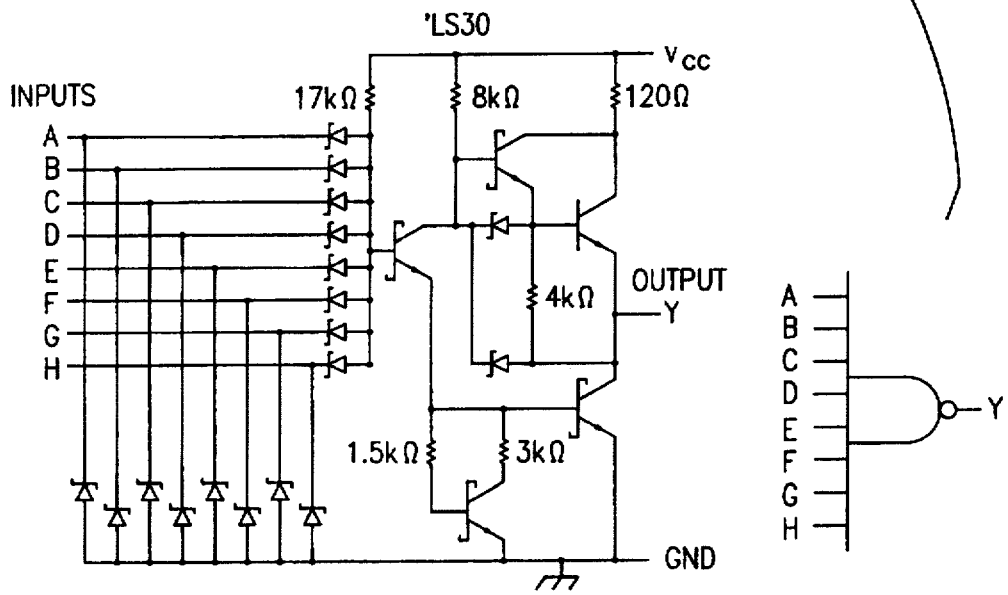
FIG. 24

FIG. 26

| 4 Element Subterms | 16 Subterms Possible |
|---|---|
| Number of Unused Subterms | 1 |
| Number of Subterms with 1 Instance | 5 |
| Number of Subterms with 2 Instances | 4 |
| Number of Subterms with 3 Instances | 2 |
| Number of Subterms with 4 Instances | 2 |
| Number of Subterms with 5 Instances | 2 |

FIG. 27

| 3 Element Subterms | 32 Subterms Possible |
|---|---|
| Number of Unused Subterms | 7 |
| Number of Subterms with 1 Instance | 8 |
| Number of Subterms with 2 Instances | 4 |
| Number of Subterms with 3 Instances | 6 |
| Number of Subterms with 4 Instances | 2 |
| Number of Subterms with 5 Instances | 3 |
| Number of Subterms with 6 Instances | 1 |
| Number of Subterms with 7 Instances | 1 |

FIG. 28

| 2 Element Subterms | 24 Subterms Possible |
|---|---|
| Number of Unused Subterms | 9 |
| Number of Subterms with 1 Instance | 3 |
| Number of Subterms with 2 Instances | 9 |
| Number of Subterms with 3 Instances | 2 |
| Number of Subterms with 4 Instances | 1 |

FIG. 29

| Gate Inputs | 2-Gate Delay | | 3-Gate Delay | |
|---|---|---|---|---|
| | Gate Instances | Instance Inputs | Gate Instances | Instance Inputs |
| 2 | 3 | 6 | 150 | 300 |
| 3 | 0 | 0 | 37 | 111 |
| 4 | 11 | 44 | 28 | 112 |
| 5 | 57 | 285 | 5 | 25 |
| 6 | 54 | 324 | | |
| 7 | 20 | 140 | | |
| 8 | 9 | 72 | | |
| Total | 154 | 871 | 220 | 548 |

Note: Does not include final OR for each output.

BOOLEAN DIGITAL MULTIPLIER

CROSS-REFERENCE TO RELATED APPLICATIONS

This U.S. patent application is based upon U.S. Provisional Patent Application Ser. No. 60/019,289, filed Jun. 7, 1996, and entitled "BOOLEAN DIGITAL MULTIPLIER".

BACKGROUND OF THE INVENTION

1. Field of the Invention

The invention relates to digital multipliers, and more particularly, to Boolean multipliers.

2. Background of the Invention

During the twentieth century, mankind has become dependent on computers for calculation and storage of scientific and business information. The processing of this information by computer requires the iterative application of basic mathematics functions. Integer binary addition and subtraction operations are easily performed in timing comparable to processor speeds. Multiplication (and inversely division), however, has traditionally been a time consuming process. Improving the processing of multiplication and division instructions can greatly enhance the power of modern computers, especially in large simulation problems that require millions of multiplication or division operations to complete.

In order to design processors with increasing speed and improved efficiency, it is necessary to minimize the delay associated with mathematical operations. The ideal is to utilize a design that produces results in one clock cycle. Addition and subtraction are easily accomplished under this constraint due primarily to carry-look-ahead adders (CLA). C. H. Chen (ed.), *Computer Engineering Handbook*, New York, McGraw-Hill, pp 4.5–4.7, 1992; O. L. MacSorley, "High-Speed Arithmetic in Binary Computers," *Proceedings of the IRE*, 49, pp 67–91, 1961. Carry-look-ahead adders produce all sum terms of an addition practically simultaneously.

Multiplication, and its inverse, division, require numerous gate delays per bit of output and are rarely capable of producing a result in a single processor clock cycle. To allow for this delay, modern RISC processors utilize a pipeline architecture that breaks the multiplication process into roughly equal tasks that can be completed in a clock cycle. A new multiplication can be launched into the pipeline each clock cycle, and one result retrieved each cycle. When programs require large numbers of multiplications to be performed sequentially, the arithmetic pipeline output approaches one operation per cycle if there are no data dependencies.

Problems that require numerous sequential multiplications, however, are rare. Programs usually contain a multiplication nested among other operations and possibly among conditional branches. In these cases the processor must wait for the multiplication to be completed by the arithmetic pipeline. This delay (latency) can cause pipeline stalls and reduce the effectiveness of the processor. As processors achieve greater clock speed and strive for higher throughputs, single-cycle multipliers become the goal of designers.

Another example of systems that are limited by multiplier speed are neural networks and systolic arrays. H. T. Kung, "Why Systolic Architectures?" *Computer Magazine*, Volume 15, January 1982, pp 37–46. These two parallel forms are constructed from numerous elementary processors, or cells, that perform simple operations on the data they receive then pass the modified data on to other cells that similarly modify and pass the data. In digital neural networks (analog neural networks also exist), the weighting of input data must be accomplished by some type of binary multiplier. This multiplication delay is the dominant factor in determining the length of each processor cycle and therefore directly influences the array throughput rate. The need for faster multipliers is critical in this specialized programming field.

Many methods exist for performing binary multiplication in computer systems. In processors currently in production, multipliers are derivatives of the parallel multiplier (discussed in greater detail belwo). These designs, while combinational in practice, are essentially based on multiplication algorithms rather than Boolean logic. The Boolean expression for the multiplication function has historically been overlooked, possibly because of high gate count requirements and complex Boolean expressions required to realize a Boolean multiplier.

High gate count is also encountered in traditional multipliers, with the number of gates increasing exponentially to the product size. Because of the exponential relationship between multiplier scale (number of bits in operands or product) and multiplier complexity (transistor count), estimations of actual multiplier size can be produced from baseline designs. FIG. 1 gives an idea of the size of 8-bit multipliers. With VLSI (Very Large Scale Integration) systems becoming commonplace and multi-million transistor circuits no longer rare, the problem has been reduced to that of mastering the Boolean expressions.

The history of using machines to compute mathematical functions is ancient and diverse. The abacus has been in use for more than 5,000 years. *Encyclopedia Britannica*, 15th Edition, Vol. 16, p 640, Chicago, 1989. In 1642, Blaise Pascal built the first adding machine and, in 1673, the first machine to include the multiplication function, Gottfried Wilhelm Leibniz's Stepped Reckoner, was built.

For centuries, mathematical functions were realized mechanically allowing operations like multiplication to be accomplished in a few seconds. In the twentieth century, computing equipment evolved into electromechanical systems capable of performing multiple multiplications per second and finally, by the 1950s, into totally electronic machines executing thousands of arithmetic operations per second.

Modern digital computers are often rated by how many mathematical operations they can perform in a given time (e.g. MFLOPS, or Millions of Floating Point operations per second). Of these millions of operations, multiplication and division are the most time consuming. In counting normalized floating point operations per second, multiplication is given a weight of 4 times that of addition. In his 1964 paper that introduced the Wallace tree adder, C. S. Wallace claimed that the arithmetic unit of a computer "used for scientific computations, will spend nearly half of its time multiplying or dividing". C. S. Wallace, "A Suggestion for a Fast Multiplier," *IEEE Transactions on Electronic Computers*, Volume 13, pp. 14–17, February 1964. The processes of multiplication and division have remained key topics for research throughout the history of the computer.

The first multiplication methods used with computers and calculating machines were, in nature, algorithms. The iterative addition method simply adds the multiplicand to itself as many times as the multiplier dictates. This method requires minimal code to implement and only one carry bit per iteration. Mechanical accounting machines utilized a hardware realization of this method for multiplication. Obviously this process can be extremely slow for large numbers.

The second method is based on the system used for multiplying decimal numbers. Each digit of the multiplier operates on the entire multiplicand to produce intermediate terms (partial products). The partial products from each operation are shifted to the proper location with respect to the exponent value of the multiplier digit, then all the intermediate terms are added to produce the final product. C. H. Chen (ed.), *Computer Engineering Handbook*, New York, McGraw-Hill, pp 4.5–4.7, 1992. FIG. 2 demonstrates this technique in identical multiplications, one in decimal, the other in binary.

This "left shift" multiplication technique requires a more complex algorithm for implementation but offers a great increase in speed over the iterative method since the number of operations is always equal to the number of bits in the operands. Left shift arrays can be easily constructed in two parts, a partial product generator; which is simply an array of logical AND gates, and the addition array; which combines all partial products to obtain the final result. Notice, however, that the sign bit is not actually generated by this technique, but must be calculated separately. This organizational requirement led Booth, in 1951, A. D. Booth, "A Signed Binary Multiplication Technique," to develop a method that returned the correct two's complement value. *Quarterly Journal of Mechanics and Applied Mathematics*, Volume 4, number 2, pp. 236–240, 1951.

Booth observed that performing a 2's complement multiplication on a multiplier designed for unsigned binary numbers produced predictable error. This result error is based on the use of 2's complement numbers. A negative number in 2's complement is defined as:

$$-m = 2^n - m \qquad (1.1)$$

for an (n–1) bit binary integer, m. (–m=2–m, for fractional binary representation.) Expanding the multiplication process around the 2's complement definition yields;

$$m \times r = mr \qquad (2.1)$$
$$(-m) \times r = r(2^n - m) = 2^n r - mr \qquad (2.2)$$
$$m \times (-r) = m(2^n - r) = 2^n m - mr \qquad (2.3)$$
$$(-m) \times (-r) = (2^n - m)(2^n - r) = 2^{2n} - 2^n m - 2^n r + mr \qquad (2.4)$$

In each of theses cases, the final term (±mr) gives the correct result and the remaining terms are error. From this Booth concluded that correcting the output simply required applying the following process:

(1) if m is negative, subtract $2^n r$ from the product;

(2) if r is negative, subtract $2^n m$ from the product;

the application of both of these corrections gives the correct result in the last case since m and r are negative, the subtraction is in effect addition of the negative terms, and $2^{2n}$ is ignored by the machine ($2^{2n}$ is beyond the MSB of the product). Booth applied the correction terms by utilizing the following examine and adjust algorithm during the multiplication:

(1) If $m_n=0$, $m_{n-1}=0$, multiply the existing sum of partial products by $2^{-1}$, i.e. perform an arithmetic shift right.

(2) If $m_n=0$, $m_{n-1}=1$, add r to the existing sum of partial products and perform arithmetic shift right.

(3) If $m_n=1$, $m_{n-1}=0$, subtract r from the existing sum of partial products and perform arithmetic shift right.

(4) If $m_n=1$, $m_{n-1}=1$, perform arithmetic shift right on sum of partial products.

(5) Do not perform arithmetic shift right at MSB.

Note: It is assumed that $m_{-1}=0$.

Booth's process amounts to adjusting for the correction factor during the multiplication process. His correction scheme works by treating each pair of bits as if they represent a magnitude and a sign bit. Using only this idea the algorithm must obey the following conditions: if the more significant of the two bits is a zero, the multiplication is treated as a positive integer multiplication; if the more significant bit is one the multiplication is treated as if needing two's complement correction. The algorithm must also account for the case when two's complement correction occurs unnecessarily. If the more significant bit is zero and the lessor bit is one, the algorithm adjusts for incorrect two's complement correction by adding r back to the sum.

Booth's algorithm can now be described by four cases:

(1) If the bits are identical, treat the situation like sign extension (shift right).

(2) If $m_n=1$, $m_{n-1}=0$ treat as a two's complement (subtract r and shift right).

(3) If $m_n=0$, $m_{n-1}=1$ adjust incorrect two's complement (add r and shift right).

(4) Case (3) cannot occur at the zeroth bit since $m_{-1}=0$ is assumed.

There are two inherent problems with the Booth algorithm. First, the algorithm does not efficiently lend itself to combinational logic. Each pair of bits must be compared to determine the proper operation. This comparison can be accomplished using a multiplexor to select the proper operation. Each operation, however, cannot proceed until the previous operation is complete; therefore a sequential delay is produced that is on the order of n, for an n-bit multiplication.

Second, Booth's algorithm, as stated in the original publication, produces a (2n–1)-bit solution. Because of this, there exists a case for which the Booth algorithm does not return a complete result. In two's complement notation, the multiplication of the most negative n-bit number times itself requires a 2n-bit result as discussed in greater detail in the Detailed Description of the Preferred Embodiment (The N-bit by N-bit Proof). Booth never defined this MSB so an ambiguity exists. In the cases when the 2n–2 bit is 1, the 2n–1 bit can be either 1 or 0.

In 1961 MacSorley published a modification to Booth's algorithm that examines 3 adjacent bits and can operate in n/2 cycles or a sequential delay on the order of n/2. O. L. MacSorley, "High-Speed Arithmetic in Binary Computers," *Proceedings of the IRE*, 49, pp 67–91, 1961. MacSorley's modified Booths algorithm consists of the following conditions:

(1) If $m_{i+1}=0$, $m_i=0$, $m_{i-1}=0$, then P=P/4, i.e. multiply the existing sum of partial products by $2^{-2}$ (perform two arithmetic right shifts).

(2) If $m_{i+1}=0$, $m_i=0$, $m_{i-1}=1$, then P=(P+r)/4, i.e. add r and then perform two arithmetic right shifts.

(3) If $m_{i+1}=0$, $m_i=1$, $m_{i-1}=0$, then P=(P+r)/4, i.e. add r and then perform two arithmetic right shifts.

(4) If $m_{i+1}=0$, $m_i=1$, $m_{i-1}=1$, then P=(P+2r)/4, i.e. add 2r and then perform two arithmetic right shifts.

(5) If $m_{i+1}=1$, $m_i=0$, $m_{i-1}=0$, then P=(P–2r)/4, i.e. subtract 2r and then perform two arithmetic right shifts.

(6) If $m_{i+1}=1$, $m_i=0$, $m_{i-1}=1$, then P=(P–r)/4, i.e. subtract r and then perform two arithmetic right shifts.

(7) If $m_{i+1}=1$, $m_i=1$, $m_{i-1}=0$, then P=(P–r)/4, i.e. subtract r and then perform two arithmetic right shifts.

(8) If $m_{i+1}=1$, $m_i=1$, $m_{i-1}=1$, then P=P/4, i.e. multiply the existing sum of partial products by $2^{-2}$ (perform two arithmetic right shifts).

where i=0 to n−1, in increments of 2, for n-bit binary operands.

MacSorley's modified algorithm obviously requires only half the iterations as Booth's original algorithm, but suffers from the same constraints. To produce a hardware array, an even larger multiplexor must be used for each stage, and each stage depends on the completion of the previous stage.

More recently (1974), Baugh and Wooley published an algorithm for simultaneously producing the intermediate terms from two's complement operands so that no correction was required in the product. C. R. Baugh and B. A. Wooley, "A Two's Complement Parallel Array Multiplication Algorithm," *IEEE Transactions on Computers*, Volume C-22: pp1045–1047, December 1973. Baugh and Wooley found that by inverting terms that were ANDed with the sign bits and adding minimal correction terms, the correct result could be directly obtained. FIG. 3 shows the Baugh-Wooley multiplication algorithm.

Later that year, Blankenship published a short note on Baugh and Wooley's algorithm, suggesting equivalent simplified logic for the correction terms. P. E. Blankenship, "Comments on 'A two's Complement Parallel Array Multiplication Algorithm,'" *IEEE Transactions on Computers*, C-23: p1327, 1974. This modification to the Baugh-Wooley algorithm is shown in FIG. 4.

The algorithm has continued to evolve to the point that NANDs are now used to produce the inverted terms and only two correction factors (both constant 1's) are required for multiplications where the lengths of the two operands are equal (see FIG. 5). It may be noted that all multiplication can be expressed as having operands of equal length with sign extension of the most significant bit in the shorter operand.

While Booth, MacSorley, Baugh, and Wooley were working on the production of the partial products, another line of research centered on the problem of adding the partial products once they had been produced.

This "reduction" process is accomplished in the classical parallel multiplier array by the use of numerous adders and half adders. These adders and half adders may be distributed among the AND and NAND gates that generate the partial products or located in segregated arrays. C. H. Chen (ed.), *Computer Engineering Handbook*, New York, McGraw-Hill, pp 4.5–4.7, 1992; D. P. Agrawal, "High Speed Arithmetic Arrays," *IEEE Transactions on Computers*, Volume C-28, March 1979, pp 215–224; D. Somasekhar and V. Visvanathan, "A 230 MHz Half-Bit Level Pipelined Multiplier Using True Single-Phase Clocking," *IEEE Transactions on VLSI Systems*, Volume 1, number 4, December 1993, pp 415–422. Using numerous adders and half adders allows a designer to create a cellular symmetric design that is easy to implement and optimize for space but exhibits excessive timing delays (on the order of 4n gate-delays for an n-bit input). These symmetric, cellular designs are referred to as parallel multipliers, but this is actually a misnomer. These devices could more correctly be called ripple-carry multipliers.

C. S. Wallace first attacked the problem of the addition delay with two new insights in 1964. The main focus of Wallace's work was to use pseudo adders that can combine three terms (the pseudo adders are actually just full adders). C. S. Wallace, "A Suggestion for a Fast Multiplier," *IEEE Transactions on Electronic Computers*, Volume 13, pp. 14–17, February 1964.

Wallace first insight was to connect these adders to combine three partial product bits and produce a sum and carry bit that would be reduced in the next addition cycle. Pryor to Wallace's work, half adders were used to add two partial product bits producing a carry bit and a sum bit. These sum and carry bits would then be added to the correct magnitude bits from the next partial product using full adders (each full adder receiving one carry and two sum inputs). The resulting sum and carries were combined with the next partial product until all terms had been combined. This re-arrangement of the full adder input bits, by itself, reduces the time to add the partial products by a factor of 1.5.

Wallace's second insight was perceiving that since all the partial products were produced simultaneously, all partial products bits of the same order could be combined simultaneously. In the classic parallel multiplier (and even in some more recent pipelined realizations, the first partial products are added together then the result added to the next partial product until all partial products have been combined (as in above discussion). D. P. Agrawal, "High Speed Arithmetic Arrays," *IEEE Transactions on Computers*, Volume C-28, March 1979, pp 215–224; D. Somasekhar and V. Visvanathan, "A 230 MHz Half-Bit Level Pipelined Multiplier Using True Single-Phase Clocking," *IEEE Transactions on VLSI Systems*, Volume 1, number 4, December 1993, pp 415–422. This process is similar to a ripple adder. Wallace created an adder tree, later called the Wallace tree, that simultaneously input all bits of the same order into pseudo adders, the results of these additions were then fed into the next layer of pseudo adders until finally, 2 long words are produced that are then added in a CLA. This second insight reduces the addition delay exponentially so that the delay due to the addition of partial products is on the order of the logarithm of the partial products. FIG. 6 shows the reduction of 12-bit partial products using a Wallace tree compose of full and half adders. The brackets at the right denote the terms to be combined each cycle. This example reduces the partial products to two terms for final addition in a CLA in 5 cycles.

As a point of interest, Wallace also commented in his paper that he could "see no good reason to depart from this general scheme" of multiplying by producing partial products (summands) and then adding these terms to produce the product.

In 1965 L. Dadda extended Wallace's concept by further developing the idea of pseudo adders. L. Dadda, "Some Schemes for Parallel Multipliers," *Alta Frequenza*, Volume 34, 1965, pp.349–365. Dadda defined logical blocks called parallel (n, m) counters as combinational networks with m outputs and n ($\leq 2^m$) inputs. Dadda used a different counter for each n-bit sub-column (parts of a column containing n-bits of the same order) of partial product bits. Each sub-column is reduced to the proper number of sum and carry bits. The next cycle then adds the sum bits to the carry bits of the same order. This is repeated until a single product emerges. This technique can produce a multiplication result in relatively few cycles. FIG. 7 shows a few of the counters developed by Dadda.

In 1976, Dadda revisited this work to include the use of PLAs (Programmable Logic Arrays) and PROMs (Programmable Read Only Memory) to implement the (n, m) counters and incorporate the use of sub-multipliers (multipliers of smaller order than the operands whose outpts could be combined like partial products). L. Dadda, "On Parallel Digital Multipliers," *Alta Frequenza*, Volume 45, 1976, pp. 574–580.

In 1977, Stenzel et al. categorized multipliers into two groups: purely iterative arrays and devices that generate a matrix of partial product terms. W. J. Stenzel, W. J. Kubitz, G. H. and Garcia.: "A Compact High-Speed Parallel Multiplication Scheme," *IEEE Transactions on Computers*, C-26: pp948–957, 1977. These partial product generators are also multipliers in themselves and are simply ROM arrays. A 4-bit by 4-bit multiplication can be realized with a 256 by 8-bit ROM, where the address is the combination of the two operands, and the result is the data stored at the particular address. Stenzel then combined these partial product generators with Wallace tree adders and higher level Dadda counter to produce efficient high-order multipliers. A 32-bit by 32-bit multiplier was described and a 24-bit by 24-bit prototype was produced.

Two's complement multiplication is possible with the Stenzel model, but the prototype operated on positive integers only and did not incorporate any type of sign correction. The limitation of this design is the practical size of the ROMs. A pure ROM multiplier of size 8-bit by 8-bit is now practical using ROMs with 64K address space. A 16-bit by 16-bit ROM multiplier, however, would be impossible with current technology due to the unavailability of 4 GB by 32-bit ROMs.

What each of these methods share is a symmetry or algorithmic approach that lends itself to n-bit descriptions. Multiplier designs currently in use represent applications of the techniques described. The only notable improvement has been the pipelining of operations. The most recent published designs still depend on iterative arrays, Baugh-Wooley sign correction, and pipelined addition matrixes which may be incorporate Wallace tree reduction. D. Somasekhar and V. Visvanathan, "A 230 MHz Half-Bit Level Pipelined Multiplier Using True Single-Phase Clocking," *IEEE Transactions on VLSI Systems*, Volume 1, number 4, December 1993, pp 415–422; D. P. Agrawal, "High Speed Arithmetic Arrays," *IEEE transactions on Computers*, Volume C-28, March 1979, pp 215–224; S. Lee and W. Hsu, "VLSI Systolic Multiplier and Adder for Digital Signal Processing," *Signal Processing*, volume 23 (1991) pp205–213; P. J. Song and G. De Micheli, "Circuit and Architecture Trade-offs for High-speed Multiplication," *IEEE Journal of Solid-State Circuits*, Volume 26 pp. 1184–1198, September 1991; J. Mori, M. Nagamatsu, and M. Hirano, "A 10-ns 54×54-bit Parallel Structured Full Array Multiplier with 0.5 micron CMOS Technology," *IEEE J. of Solid-State Circuits*, Volume 26, pp 600–606, April 1991; A. Takach and N. Jha, "Easily Testable Gate-Level and DCVS Multipliers," *IEEE Transactions on Computer-Aided Design*, Volume 10, No. 7, pp 932–942, July 1991.

In addition to the published literature, U.S. Pat. No. 3,914,589 to Gaskill et al. describes a 4-bit by 4-bit multiplier. The Gaskill multiplier is a Boolean multiplier. The disadvantages of the device is that the design depends heavily on exclusive-OR (XOR) logical gates and produces T and S terms that must be logically combined to produce the multiplication result. The T and S terms have a maximum 3-gate delay and the combination of the T and S terms also requires a 3-gate delay, producing a maximum 6-gate delay (not counting inverter terms). The equations used by Gaskill will be compared in the Detailed Description of the Preferred Embodiment to the Boolean expressions developed in this work.

The problem of multiplying binary numbers in computing machines has been studied in great detail in the last fifty years and is well understood. The basic binary multiplication technique is similar to the method for multiplying decimal numbers. The technique includes the generation of partial products followed by the addition of the partial products to produce the final product. Algorithms have been developed to handle 2's complement numbers and to speed the process of adding the partial products. Despite the extensive research in this area, all the techniques that have been documented for binary multiplication include the production of partial products and the reduction, or addition, of these intermediate terms to produce the final product. As such, a need continues to exist for a multiplier capable of functioning in the quickest manner possible. The present invention provides such a multiplier.

BRIEF DESCRIPTION OF THE DRAWINGS

Figures 1, 2:
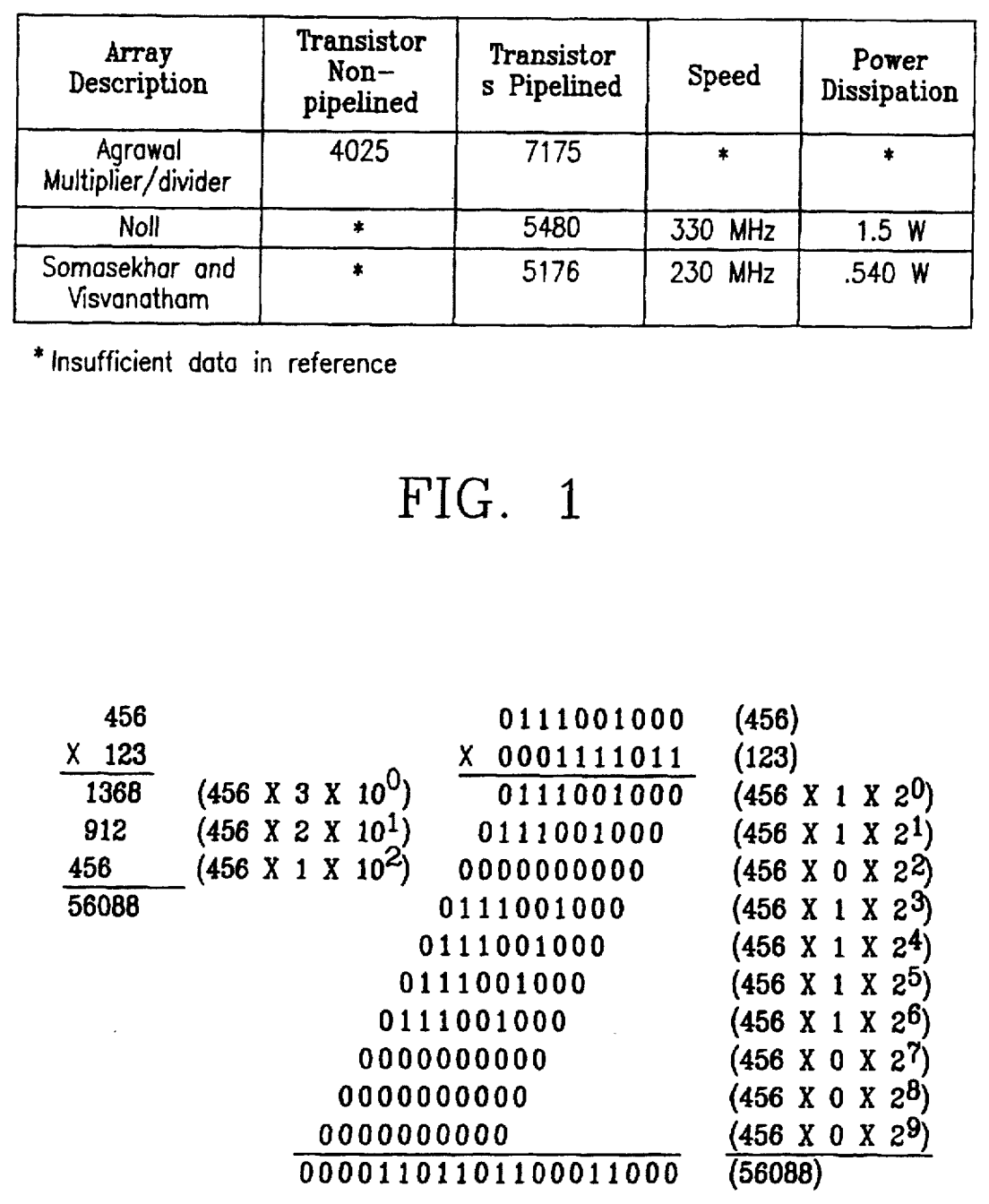

FIG. 1 is a Comparison of 8-bit by 8-bit Multipliers.

FIG. 2 is a Decimal and Binary "Left-Shift" Multiplication.

FIG. 3 is a Baugh-Wooley Multiplication Algorithm.

FIG. 4 is a Modified Baugh-Wooley Multiplication Algorithm.

FIG. 5 is a Fully Modified Baugh-Wooley Multiplication Algorithm.

FIG. 8 is an Example of Greatest Magnitude n-digit Multiplication.

FIG. 18 is a 10-bit by 10-bit Binary Multiplication and Matrix Representation.

FIG. 19 is an Alternative Karnaugh Map Example.

FIG. 20 is a Modified Gray-code Alternative Karnaugh Map Example.

FIG. 21 is a Two's Complement Alternative Karnaugh Map Example.

FIG. 23 is a Comparison of Boolean Multiplier to Baseline Designs.

FIG. 24 is a Comparison of 2-input and 8-input TTL Gates.

FIG. 26 is a table of Instances of 4 Element Subterms in 4-bit Unsigned Multiplier.

FIG. 27 is a table of Instances of 3 Element Subterms in 4-bit Unsigned Multiplier.

FIG. 28 is a table of Instances of 2 Element Subterms in 4-bit Unsigned Multiplier.

FIG. 29 is a labbe of comparison of economy of 2-gate delay and 3-gate delay multiplier.

SUMMARY OF THE INVENTION

Figure 6:
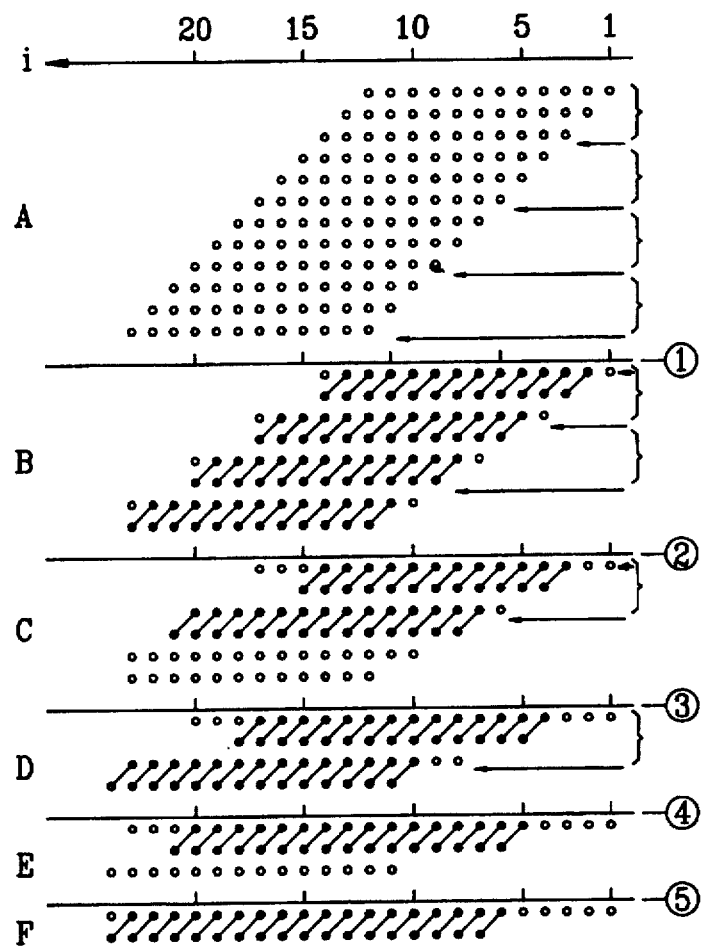
FIG. 6 is a Reduction of Partial Products using a Wallace Tree.
Figure 7:
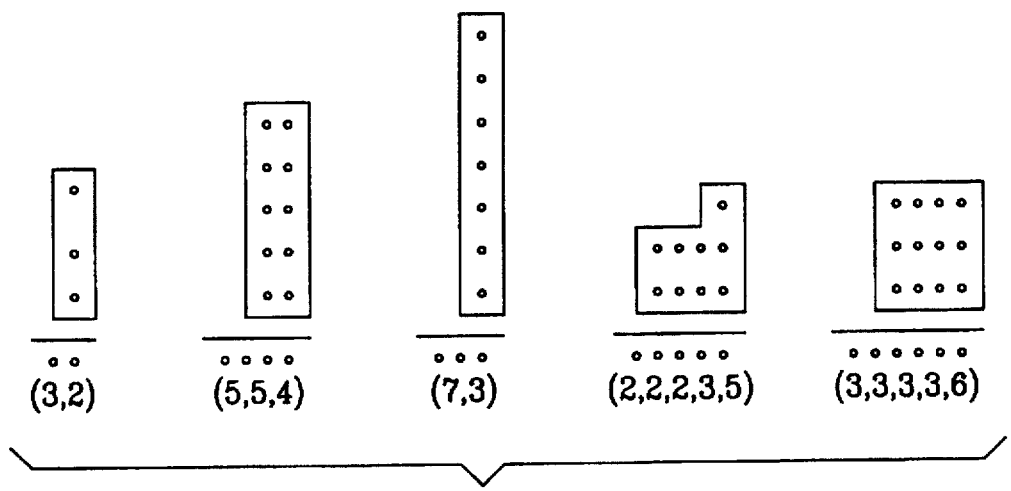
FIG. 7 is a Generalized Dadda Counters.
Figure 9:
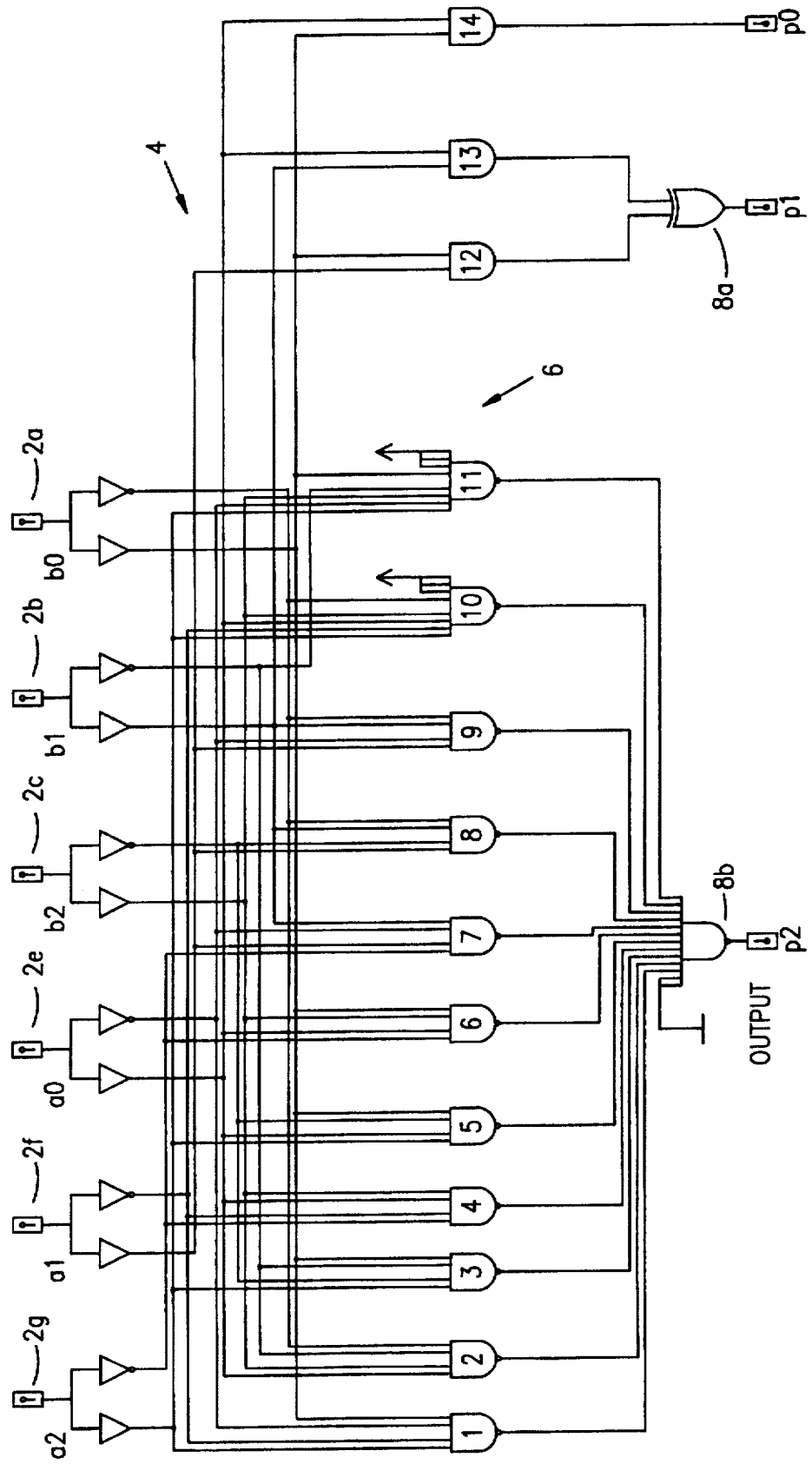
FIGS. 9–14 are a schematic of an unsigned 4-bit by 4-bit multiplier.
Figure 10:
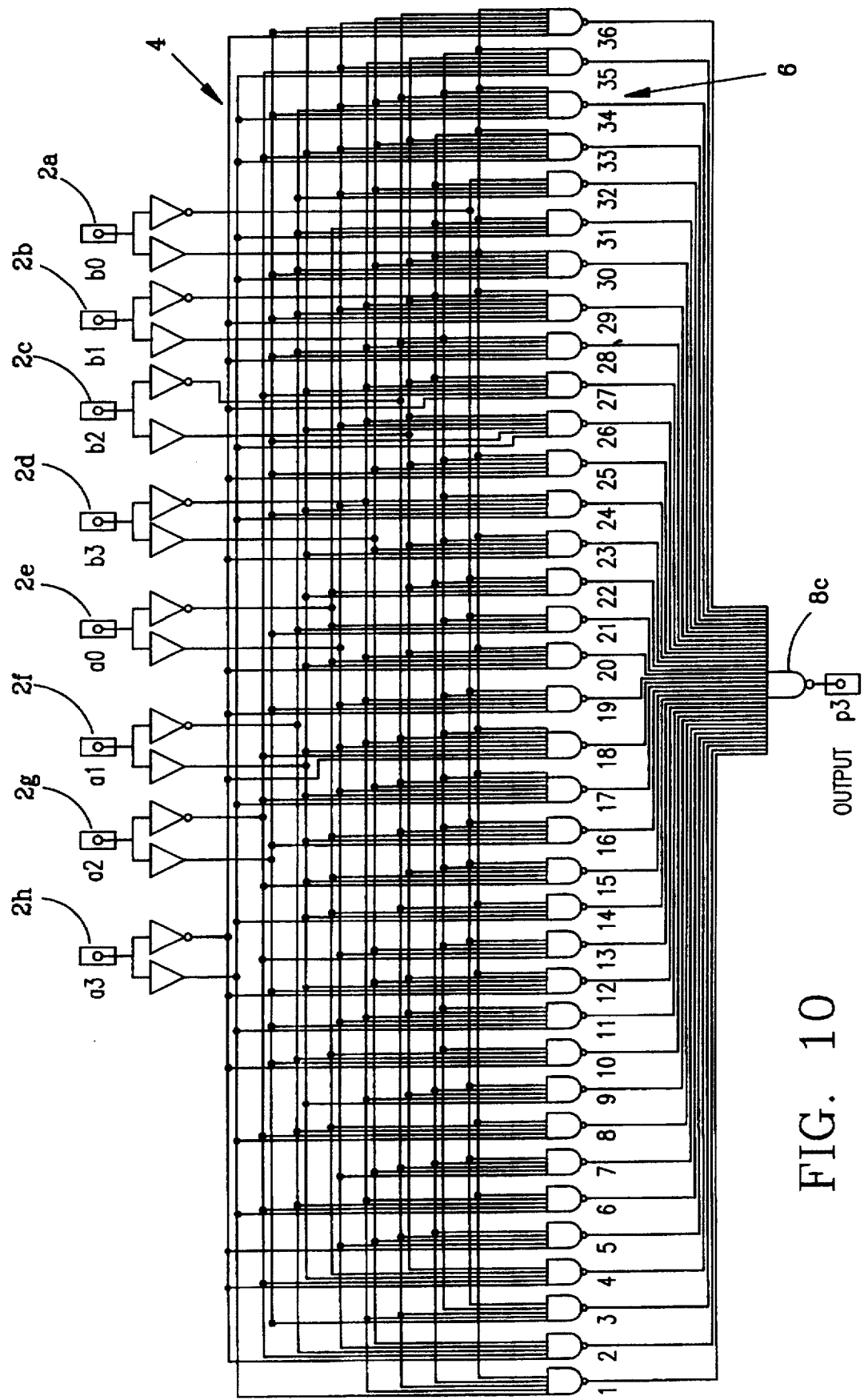
Figure 11:
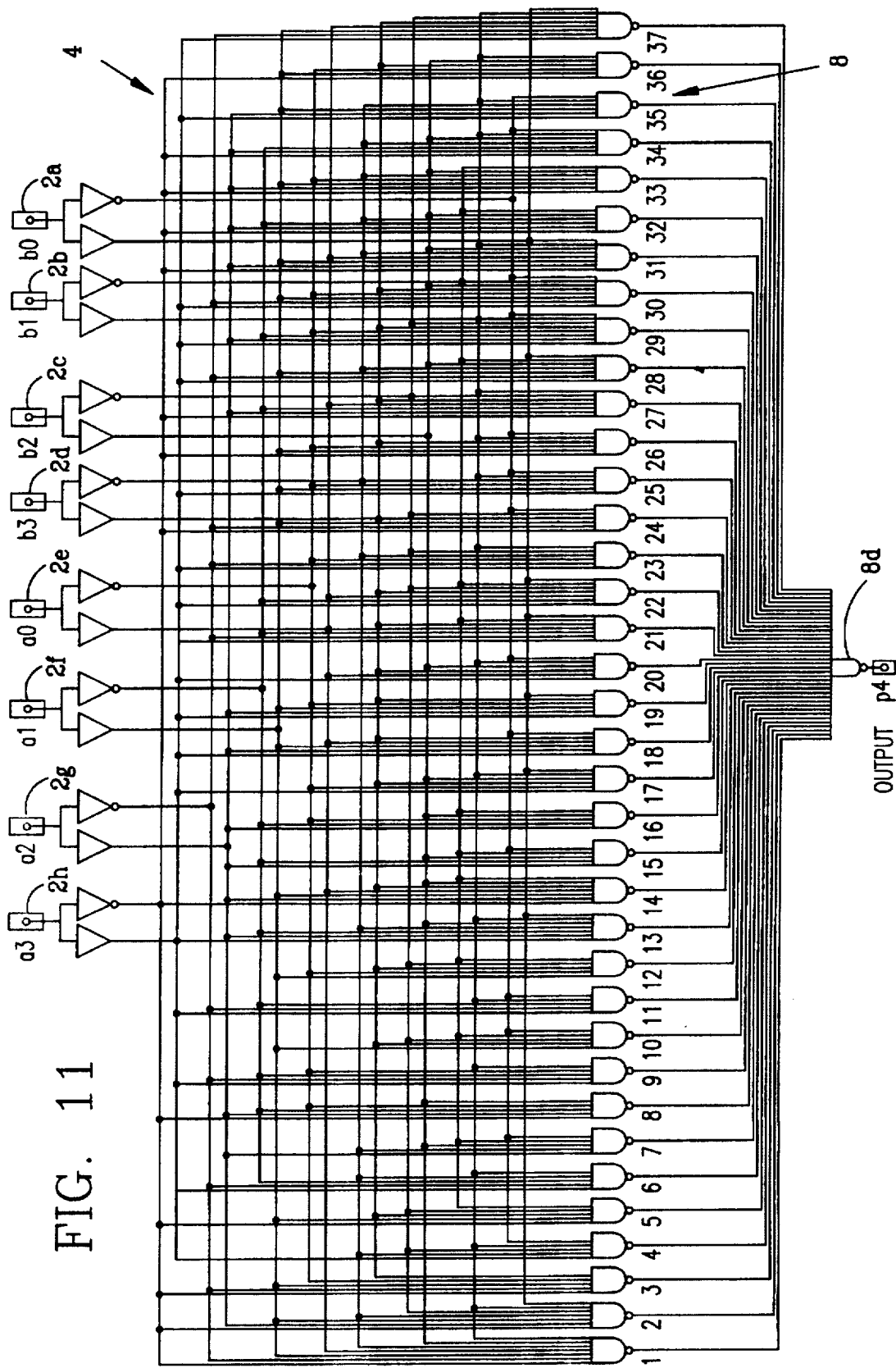
Figure 12:
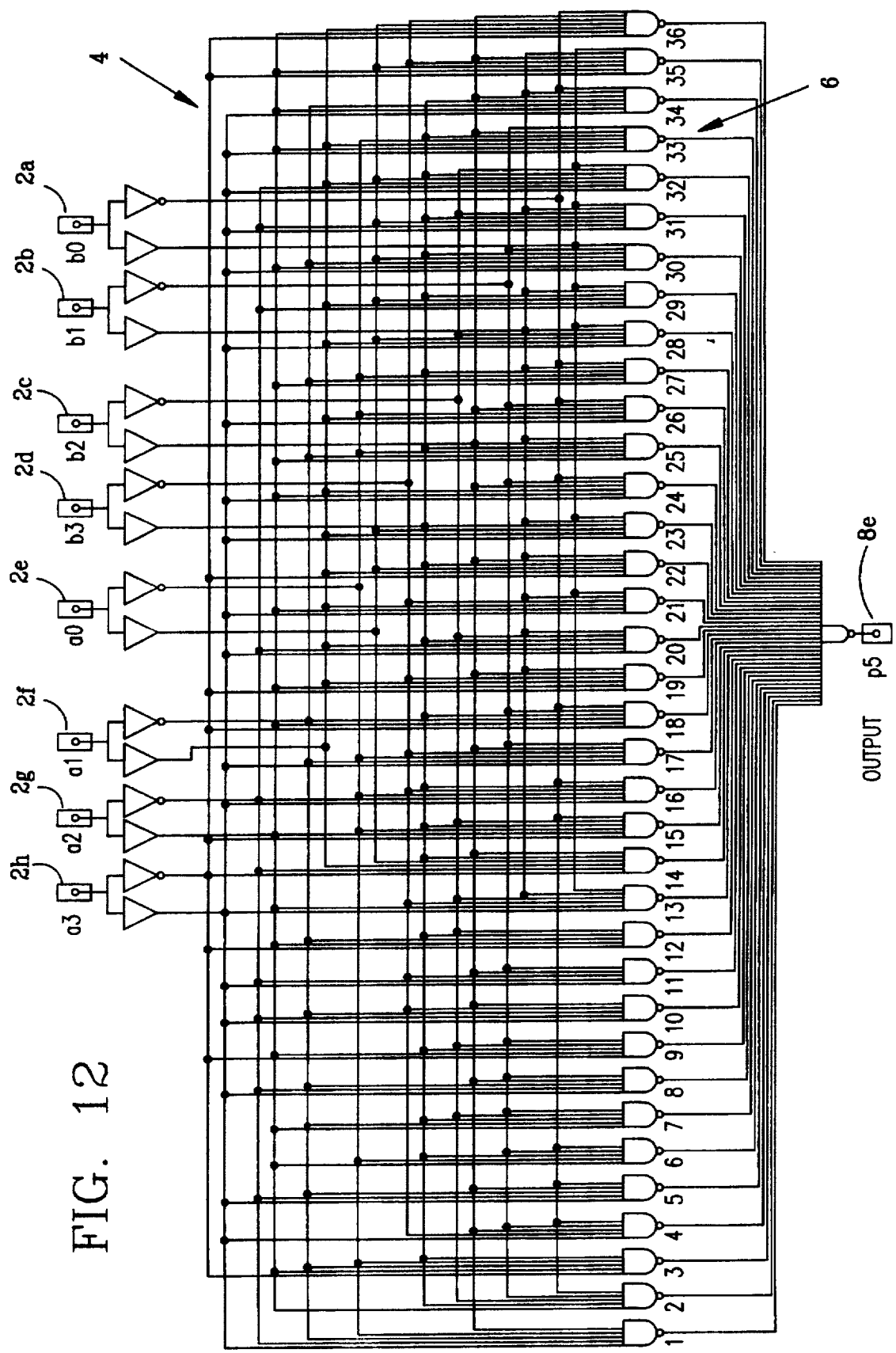
Figure 13:
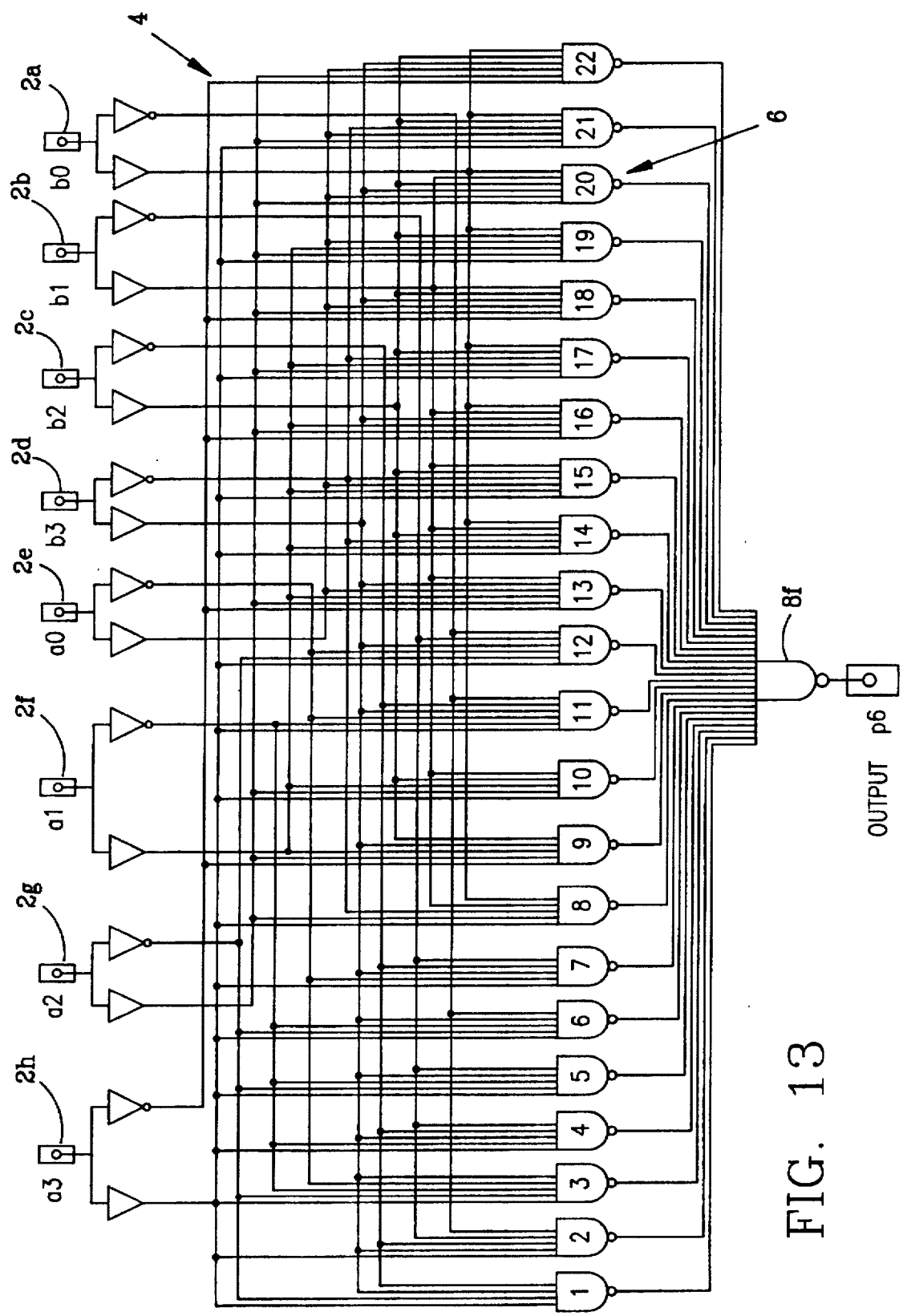
Figure 14:
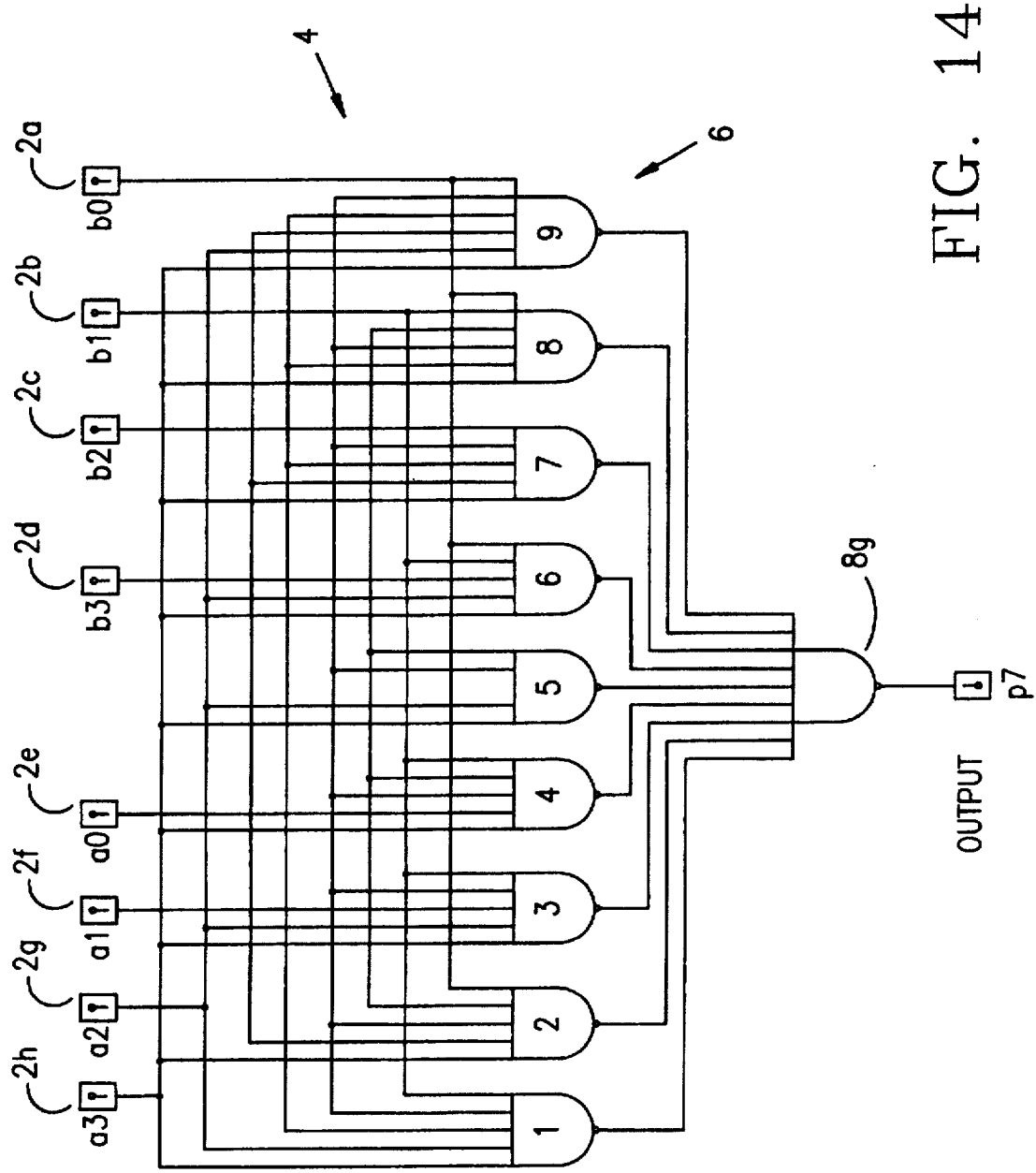

It is, therefore an object of the present invention to provide a boolean multiplier. The boolean multiplier includes a plurality of input buffers for storing a first operand and a second operand. The multiplier also includes a first set of gates coupled to the input buffers, the first set of gates respectively combining the first operand and the second operand with Boolean function to produce logical products. The multiplier further includes a second set of gates coupled to the first set of gates, the second set of gates respectively combining the logical products with Boolean functions to produce specific product bits.

Other objects and advantages of the present invention will become apparent from the following detailed description when viewed in conjunction with the accompanying drawings, which set forth certain embodiments of the invention.

DETAILED DESCRIPTION OF THE PREFERRED EMBODIMENT

BACKGROUND OF BOOLEAN MULTIPLIERS

The product bits of a digital multiplier can be produced as Boolean combinations of the inputs (i. e. operand bits). The present invention uses these Boolean representation as a method of multiplication. i.e. a Boolean multiplier.

In a Boolean multiplier, each output bit is produced independently of, and in parallel with, the production of all other product bits. In this way, the Boolean multiplier is analogous to the carry-look-ahead adder.

In accordance with the present multiplier Boolean method is used to produce a maximum speed multiplier, that is a multiplier with only two gate delays from operand input to product output (not counting term inverters and buffers). The 4-bit by 4-bit case (8-bit product), both 2's complement and unsigned binary, are studied to demonstrate the process.

A. The N-bit by N-bit Proof

In order to later state certain conditions of both the unsigned binary and the 2's complement multiplication cases, it is necessary to prove the need for a 2n-bit result for an n-bit by n-bit multiplication. Since the method utilized here is in the form of an n-digit polynomial, the proof is applicable to multiplication in any base.

Any n-digit number in base x can be expressed as a polynomial of the form:

$$a_0x^{n-1}+a_1x^{n-2}+\bullet\bullet\bullet+a_{n-2}x^1+a_{n-1}x^0 \qquad (1.1)$$

where $a_0$, $a_1$, $a_2$, $\bullet\bullet\bullet$, $a_{n-1}$ are digit values in the range $0 \leq a \leq x-1$. For binary (base 2) numbers, a=0 or 1.

An n-bit multiplier must be designed to handle the greatest input that can be represented in n digits, so this proof is concerned with the case where all $a_i$=x-1, for i=0 to n-1. The polynomial thus formed is:

$$ax^{n-1}+ax^{n-2}+\bullet\bullet\bullet+ax^1+ax^0=x^n-1, \text{ when } a=x-1 \qquad (1.2)$$

It then becomes simple to bound the size of the n-bit multiplication by examining the product of $x^n$ $x^n$ which, by the rule of exponential algebra, equals $x^{2n}$. Since:

$$x^n > x^n-1 = ax^{n-1}+ax^{n-2}+\bullet\bullet\bullet+ax^1+ax^0 \qquad (1.3)$$

$x^{2n}$ is greater than the result of the greatest magnitude n-digit by n-digit multiplication. Note that this is exclusively greater than. Since we are dealing with integers, the largest term of the n-digit multiplication product is not greater than $(x-1)x^{2n-1}$. Since the largest product term is of the order $x^{2n-1}$, the product of an n-digit by n-digit multiplication is at most 2n digits in size.

To show that the product of the greatest magnitude n-digit by n-digit multiplication is at least 2n digits in size, express the problem as:

$$(x^n-1)(x^n-1)=x^{2n}-2x^n+1 \qquad (1.4)$$

Now, we not only know the number of digits in the product for the greatest magnitude n-digit by n-digit multiplication, we also know what those digits will be in any base:

The zeroth or least significant digit is one (1), the nth digit (or digit in the $x^n$ column) is x-2, the digits between the zeroth and nth digits will be zeros (0), all digits of greater significance than the nth digit will be x-1.

Consider the examples in FIG. 8. Note that x-2 is zero in the case of binary multiplication. This gives the appearance of a contradiction for the one-digit case, but the 2n digit exists and is exactly x-2 for this case, just as in all other cases.

Different formats exist for representation of signed integers. The two's complement system has become the predominant system for digital computers and is based on the ten's complement system for decimal numbers. C. H. Roth, *Fundamentals of Logic Design*, Third Edition, pp 439–441, 1985. The general case of x's complement numbers, for numbers in base x, will be investigated to derive a broad basis for the specific case of two's complement numbers.

The format definition of an n-bit system is:

$$+m=m \qquad (1.5)$$

$$-m=x^n-m \qquad (1.6)$$

Where m represents an (n–1) digit number, so to represent a k-digit number in x's complement format requires a (k+1)-digit x's complement number. A positive number in x's complement format always has a zero as the most significant digit. The greatest magnitude positive value that can be expressed in an n-digit x's complement number is $x^{n-1}-1$; so that exactly $x^{n-1}-1$ positive values can be represented.

All negative numbers in this format have x-1 as the most significant digit. This format allows all values, positive or negative to be expressed without special symbols, using only x digits. Because of this, the greatest magnitude negative value that can be expressed is $x^{n-1}$; which is represented by x-1 as the most significant digit followed by zeros for all other digits (from equation (1.7)). So exactly $x^{n-1}$ negative values can be represented.

$$x^n-x^{n-1}=(x-1) \, x^{n-1} \qquad (1.7)$$

By definition, zero is always expressed as n zeros. Thus, the total number of values, d, that can be represented is the number of positive values ($x^{n-1}-1$) plus the number of negative values ($x^{n-1}$) plus the one zero value which sum to $2^{n-1}$. The number of discrete values in x's complement format, d, is defined in equation (1.8).

$$d=(x^{n-1}-1)+x^{n-1}+1=2x^{n-1} \qquad (1.8)$$

The definition of an n-bit 2's complement number is:

$$+m=m \qquad (1.9)$$

$$-m=2^n-m \qquad (1.10)$$

Where m is an (n–1) bit value. The two's complement format, as a subset of the x's complement system, is not actually a sign-magnitude format, but a weighted system with the MSB having a negative weight.

The two's complement multiplication presents a unique subset of the n-bit by n-bit proof. Since the result is also in the two's complement format, it would seem that (2n–1) bits are sufficient since one sign bit is economized in the process.

However, based on equation (1.8), 2 $x^{n-1}$ unique values that can be represented equates to $2^n$ unique numbers. This is exactly the number of values represented by an n-bit positive integer binary number, implying that the result would require as many bits. The case of squaring the most significant negative value is the problem. From the x's complement definition, the n-bit two's complement number with a zero most significant bit followed by all ones (0111, is the 4-bit example) equals $2^{n-1}-1$; while a one in the MSB followed by all zeros equals $-2^{n-1}$. Returning to the algebraic proof technique:

$$(-2^{n-1}) \times (-2^{n-1}) = +2^{2n-2}. \tag{1.11}$$

In order to represent $+2^{2n-2}$ in 2's complement format, a zero MSB (in the $2^{2n-1}$ position) is needed to denote a positive number. Therefore, a 2n-bit product is required.

B. Definitions and Symbol Conventions

Due to the nature of this research, extensive use of Boolean equations is required to properly communicate the concepts and results. The following text describes the symbol convention and some of the basic definitions used throughout this thesis.

Because of the commutative property of multiplication, the Multiplicand, A, and Multiplier, B, are treated as identical operands. The bits of each operand are noted as $a_0$, $a_1$, ... $a_{n-1}$ and $b_0$, $b_1$, ... $b_{n-1}$, respectively where the subscript refers to the power of 2 so that the least significant bit (LSB) of A is $a_0$, and the most significant bit MSB of an n-bit operand B is $b_{n-1}$. The product, or result, is referenced as P with bits $p_0$, $p_1$, ... $p_{2n-1}$ for the 2n-bit product of an n-bit by n-bit multiplication.

Where multiplications of various order are referenced, a dual subscript system is employed where the first subscript refers to the bit size of the word and the second subscript refers to the specific bit. By this convention, $b_{16,8}$ represents the eighth bit of a 16-bit multiplier and $p_{32,7}$ represents the seventh bit of a 32-bit product (the product of two 16 bit multiplicands). The LSB of each operand or product, $x_0$, will be referred to as the zeroth bit and the $x_1$ term will be referred to as the first bit, where the subscript refers to the respective exponent of two.

All binary numbers will be represented in the binary integer format as opposed to fractional binary format, such that each bit equals its digit times two raised to the m power where m is the position subscript. As an example, product bit $p_3$ represents the value p times $2^3$ where p=0 or 1, and $b_0$ (LSB of B operand) represents b times 1, or simply, the value of the least significant digit. Some of the references used in this thesis utilize fractional binary notation with a binary point following the MSB. In these cases, all formulae, theory, and discussion have been converted to integer binary notation for clarity and consistency. Whenever the fractional notation is used, it will be clearly identified as such.

METHODOLOGY

FIGS. 9–14 are schematics of a multiplier manufactures in accordance with the present invention. The schematic demonstrates a multiplier for an unsigned 4-bit by 4-bit multiplier. Accordingly, $a_3$, $a_2$, $a_1$ and $a_0$ respectively represent the input bits of operand A and $b_3$, $b_2$, $b_1$ and $b_0$ respectively represent the input bits. The product bits are respectively represented by $p_7$, $p_6$, $p_5$, $p_4$, $p_3$, $p_2$, $p_1$ and $p_0$. As will become apparent with the subsequent discussion, the multiplier could readily be extended to handle higher level operandi without departing from the spirit of the present invention.

Referring to FIGS. 9–14, input signals are provided to input buffers 2a–2h. The bits provided to the input buffers are transmitted on a bus 4 to a first set of NAND Gates 6. After passing through the first set of NAND Gates the processed bits are transmitted to a second set of NAND Gates 8a–8g where the bits are final processed to produce specific product bits.

If desired, the NAND/NAND multiplier could be converted to a AND/OR multiplier by replacing the first set of NAND Gates with AND Gates and replacing the second set of NAND Gates to OR Gates. While this conversion would alter the logic of the present invention, it is considered to be within the spirit of the present invention.

Figure 15:
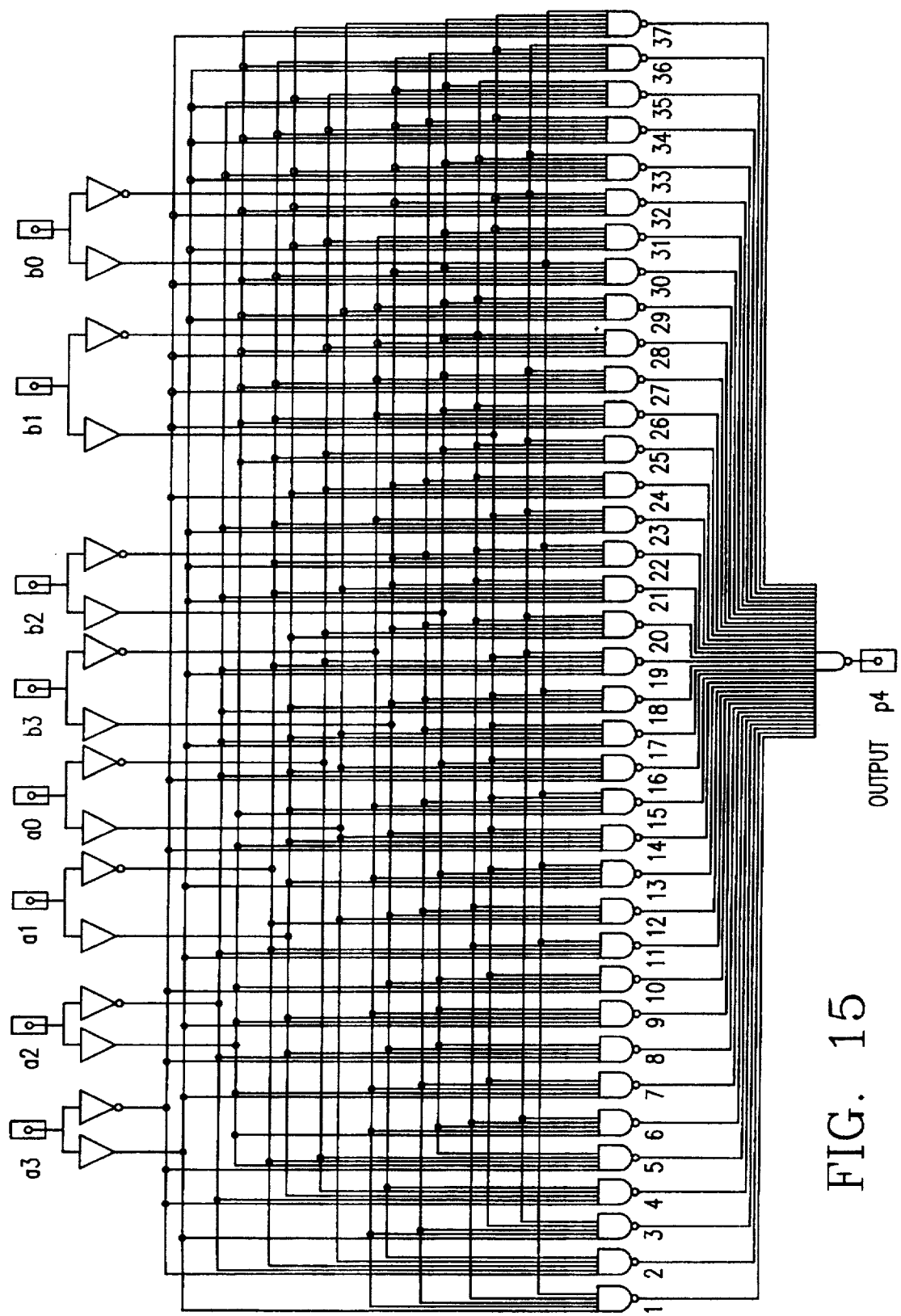
FIGS. 15–17 are a schematic of the most significant portion of the two's complement (signed multiplier).
Figure 16:
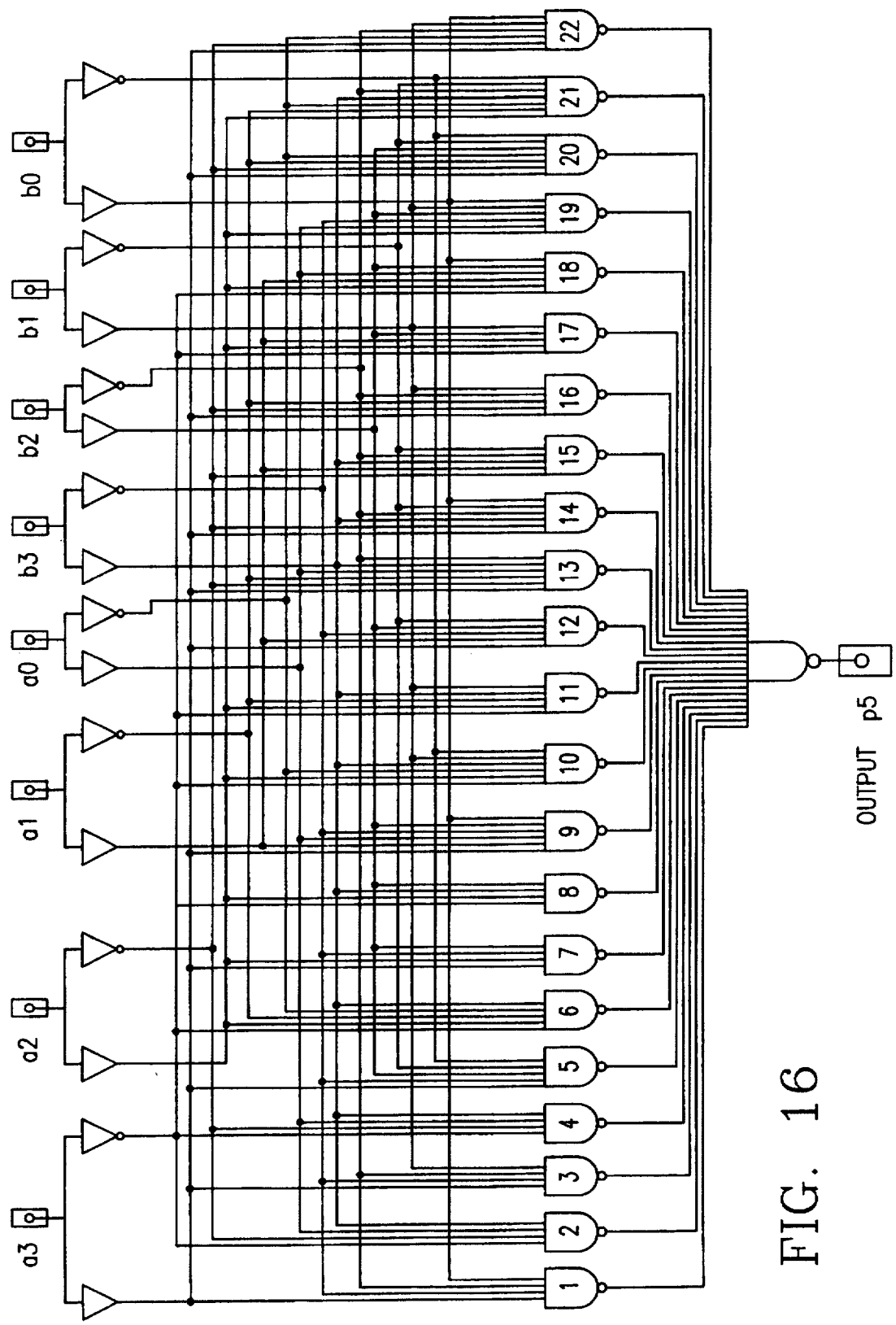
Figure 17:
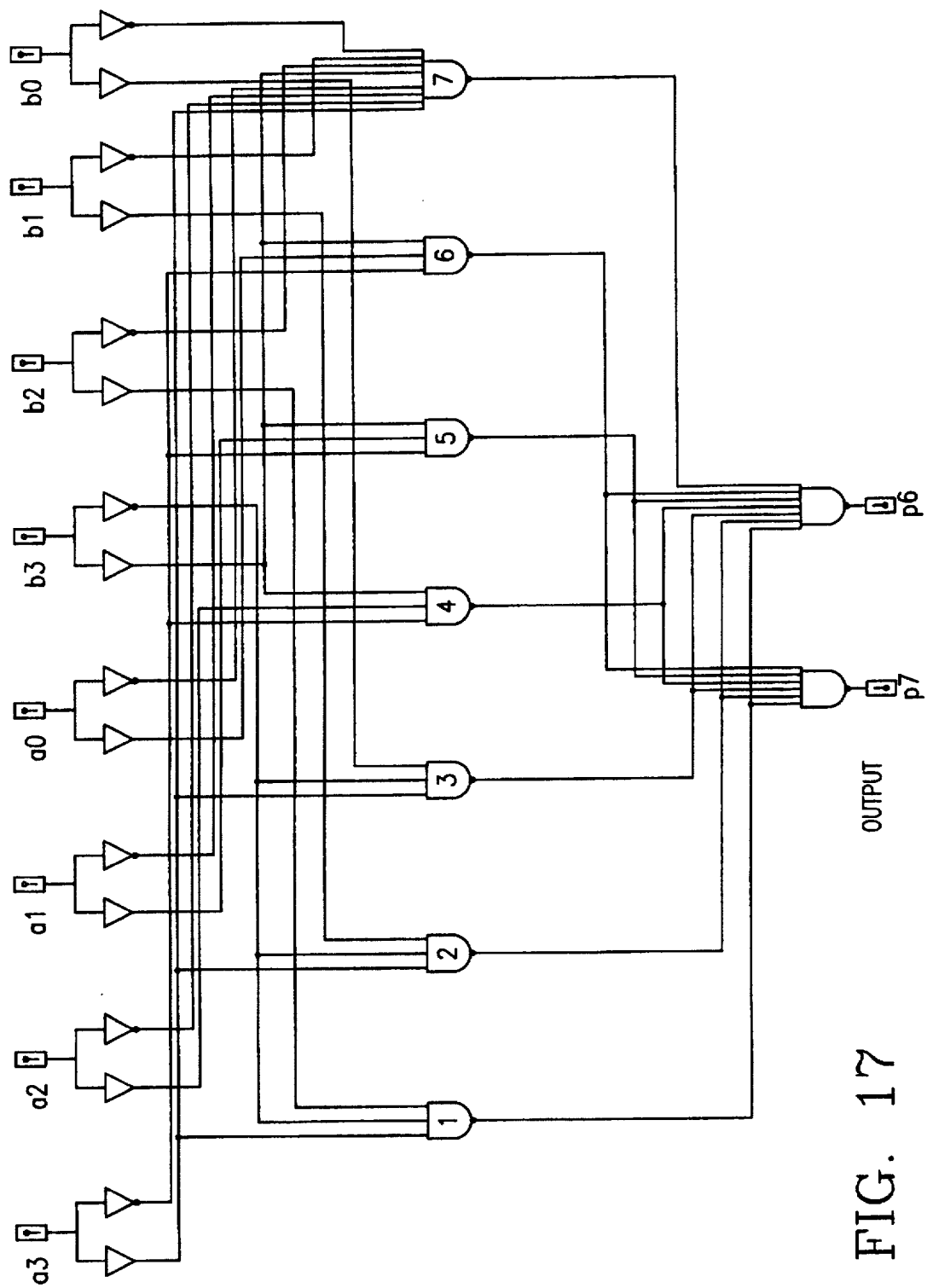

FIGS. 15–17 disclose a schematic for the most significant portion of the two's complement multiplier (signed multiplier). As with the 4-bit by 4-bit unsigned multiplier, the two's complement includes input buffers for input bits $a_3$, $a_2$, $a_1$, $a_0$, $b_3$, $b_2$, $b_1$ and $b_0$. The multiplier also includes first set of NAND Gates and a second set of NAND Gates. The second set of NAND Gates produce product bits $p_7$, $p_6$, $p_5$, and $p_4$. $P_3$–$P_0$ are produced in the same manner as with $p_3$–$p_0$ of the unsigned multiplier shown in FIGS. 9–14. As such, your attention is particularly directed to FIGS. 9–11.

A. Introduction

Specifically, to visualize how each term can be produced, consider the 10-bit by 10-bit multiplication example from FIG. 8. The example is reproduced in FIG. 18 in binary and matrix representation. The matrix representation allows straight forward analysis of the multiplication process and the resulting hardware realization. The black dots in the matrix representation denote single bit terms. In the inputs (Operand A and Operand B), each dot is an input bit ($a_i$ or $b_i$). In the intermediate terms each dot represents the logical AND of two of the input bits.

The first partial product (for this 9-bit case) is:

$a_9b_0 \; a_8b_0 \; a_7b_0 \; a_6b_0 \; a_5b_0 \; a_4b_0 \; a_3b_0 \; a_2b_0 \; a_1b_0 \; a_0b_0$

Most fast multipliers produce the intermediate terms logically and then produce the final product by use of Wallace/Dadda (or Wallace tree architecture) adders that combine the intermediate terms faster than full adders. O. L. MacSorley, "High-Speed Arithmetic in Binary Computers," *Proceedings of the IRE*, 49, pp 67–91, 1961; H. T. Kung, "Why Systolic Architectures?" *Computer Magazine*, Volume 15, January 1982, pp 37–46; D. Somasekhar and V. Visvanathan, "A 230 MHz Half-Bit Level Pipelined Multiplier Using True Single-Phase Clocking," *IEEE Transactions on VLSI Systems*, Volume 1, number 4, December 1993, pp 415–422. In the Boolean multiplier, the intermediate terms are disregarded and the multiplier proceeds directly to the product, but the process must still account for the same "virtual" operations.

The Boolean exclusive-OR (XOR, $\oplus$) function produces the sum bit for each addition. Each product bit can then be produced by the XORing of the pertinent intermediate term bits and the proper carry information. This is not necessary for $p_0$. Since there is no addition involved in its production; the algorithm still applies to this case.

The product bits can be expressed as $$p_n = a_0 b_n \oplus a_1 b_{n-1} \oplus \ldots \oplus a_{n-1} b_1 \oplus a_n b_0 \oplus c_{n-1,n} \oplus c_{n-2,n} \oplus \ldots \oplus \tag{3.1}$$

where $c_{x,y}$ represents the carry bit of magnitude y, produced by the addition of terms of magnitude x (for bit $p_x$). From this, the following terms are developed:

$$p_0 = a_0 b_0 \tag{3.2}$$

$$c_0 = 0 \tag{3.3}$$

$$p_1 = a_0 b_1 \oplus a_1 b_0 \tag{3.4}$$

$$c_{1,2} = a_0 a_1 b_0 b_1 \quad (3.5)$$

$$p_2 = a_0 b_2 \oplus a_1 b_1 \oplus a_2 b_0 \oplus a_0 a_1 b_0 b_1 \quad (3.6)$$

These terms demonstrate that Boolean expressions are produced from equation (3.1). Equations (3.2) and (3.4) are sufficient for $p_0$ and $p_1$ for any size multiplier, whether 2's complement or unsigned binary. Gaskill utilizes equations (3.2), (3.4), and (3.6) for the first three product terms, but never explicitly states equation (3.1). Gaskill also does not attempt to produce the expression in 2-gate delay form. J. R. Gaskill Jr., L. R. Weill, "Four-by-four bit Multiplier Module having Three Stages of Logic Cells," U.S. Pat. No. 3,914,589, October 1975.

The long XOR dependent expressions for higher order terms are difficult to realize without disproportionate timing delays. Additionally, each bit order creates carry terms that become more difficult to produce and to consider in the output terms that they affect. As an example, the second order terms produce product $p_2$, equation (3.6), and two carry terms, $c_{2,3}$ and $c_{2,4}$ (to be added into to the third order and fourth order terms respectively). The problem of generating the product terms by Boolean algebra becomes more complicated as the magnitude of bit increases and more dependent on the XOR function.

These Boolean multiplication expressions could be produced through the use of a computer program. However, a more direct method is to generate alternative Karnaugh maps (K-maps) that represent the binary equivalent of multiplication tables for each output bit. For large multipliers, this method is extremely time consuming (as will be discussed below in the Results and Findings) but is suitable for the four bit case. So, to avoid complicated Boolean functions and excessive use of XOR, the remaining terms have been produced through the use of Karnaugh maps. Since each product bit is treated independently, each map represents one output bit.

Terms for Quine-McCluskey method simplification can also be produced. In fact, the identification of minterms for the K-maps is identical to producing minterms for a Quine-McCluskey simplification. The two methods are actually only different perspectives of the same approach. C. H. Roth, *Fundamentals of Logic Design*, Third Edition, pp 232–233, 1985. For this research, the production of terms using K-maps was selected because of advantages in programming simplicity and because the graphical nature of the maps allows the problem to be "viewed" and lends itself to certain insights that will be discussed later.

B. Generation of Boolean Terms

1. Automated K-map Production

The production of logical expressions from Karnaugh maps is tedious but opportunities exist to simplify the process and better understand the mechanism of multiplication. A Microsoft QuickBASIC (version 4.5) program was used to produce the alternative Karnaugh maps in a format compatible with Microsoft Excel (see FIG. 19). Karnaugh maps for 4-bit multiplications, in both 2's complement and unsigned format, were produced. The resulting two dimensional maps were then used to produce Boolean expressions.

The K-map generating programs produced a single map for each output term by computing each multiplication and then examining the state of the pertinent bit in the result. For this research, each multiplication was repeated for each K-map. A more efficient approach would have been to compute each multiplication and then extract all the output values before proceeding to the next operation. This alternative method would have required producing multiple output files simultaneously, one for each K-map. Considering the limited number of reasonably sized maps required, the method of producing each K-map separately was acceptable. (More on the size of Karnaugh maps and number of minterms in the Results and Findings section.)

For higher order unsigned cases (i>n for product bit $p_{2n,i}$ of an n-bit multiplier), the production of Boolean terms from K-maps was simplified when a modified gray code was used to organize terms in the Karnaugh maps (see FIG. 20). The modification was to organize the bits so that the least significant bit has the lowest frequency of change. The other bits are treated in their normal order, so that al changes most often. The map is then divided into four quadrants depending on the value of the LSB of the operands. One quadrant represents the results of an odd-odd multiplication, two quadrants are odd-even, and the last quadrant is even-even.

Because of the significance of the sign bits in two's complement notation, the use of standard gray code gives the clearest representation of the Boolean terms (see FIG. 21). Modified and standard gray code Karnaugh maps were produced for every product term in both unsigned and two's complement. These complementary graphical representations were used to check the derived Boolean expressions for accuracy and efficiency.

2. K-map Simplification

After production and verification of the alternative K-maps, each map was simplified into AND-OR Boolean expressions by combining minterms. This process yielded long expressions that relate to the fastest possible form, a 2-gate delay circuit. As pointed out earlier, the zeroth and first terms are already known. The complete Boolean expressions for 4-bit by 4-bit, 2-level logic, unsigned multipliers are listed in the following equations. Equations for the lower order bits, $p_0$ to $p_3$, are valid for all multiplications of higher bit count, both two's complement and unsigned form.

$$p_0 = a_0 b_0 \quad \text{(one gate delay)} \quad (3.2)$$

$$p_1 = a_0 b_1 \oplus a_1 b_0 \quad \text{(two gate delays)} \quad (3.4)$$

$$\begin{aligned}p_2 =\ & a_2 a_1 a_0 b_0 + a_0 b_2 b_1 \overline{b_0} + a_2 b_2 b_1 b_0 + a_2 a_1 a_0 b_2 + a_2 a_0 b_2 b_0 + \\ & a_2 a_0 b_2 b_0 + a_2 a_1 a_0 b_1 + a_1 b_2 b_1 b_0 + a_1 a_0 b_1 b_0 + \\ & a_2 a_1 a_0 b_2 \overline{b_0}^* + a_2 \overline{a_0} b_2 b_1 b_0{}^*\end{aligned} \quad (3.7)$$

$$\begin{aligned}p_3 =\ & a_3 b_3 b_2 b_1 b_0 + a_3 a_2 \overline{a_1} a_0 b_3 + a_2 b_3 b_2 b_1 \overline{b_0} + \overline{a_3} a_2 a_1 a_0 b_2 + \\ & a_3 a_0 b_3 b_2 b_1 + a_3 a_2 \overline{a_1} b_3 b_0 + a_0 b_3 b_2 b_1 b_0 + a_3 a_2 a_1 a_0 b_0 + \\ & a_1 b_3 b_2 b_1 b_0 + a_3 a_2 a_1 \overline{a_0} b_1 + a_3 a_2 a_0 b_3 b_2 b_1 + a_3 a_2 a_1 b_3 b_2 b_0 + \\ & a_2 a_0 b_3 b_1 b_0 + a_3 a_1 a_0 b_2 b_0 + a_2 a_1 a_0 b_2 b_1 b_0 + a_2 a_1 a_0 b_2 b_1 b_0 + \\ & a_3 a_2 a_1 a_0 b_3 b_2 b_1 b_0 + a\overline{3} a_2 a_1 a_0 b_3 b_2 b_1 b_0 + a_3 a_2 a_0 b_3 b_2 b_1 b_0 + \\ & a_3 a_1 a_0 b_3 b_2 b_0 + a_2 a_1 a_0 b_1 b_0 + a_1 a_0 b_2 b_1 b_0 + a_3 a_1 b_3 b_2 b_1 b_0 + \\ & a_3 a_2 a_1 a_0 b_3 b_1 + a_3 a_2 b_3 b_2 b_1 b_0 + a_3 a_2 a_1 a_0 b_3 b_2 + \\ & a_3 a_2 a_1 b_3 b_2 b_1 + a_3 a_2 a_1 b_3 b_2 b_1 + a_3 a_2 a_1 a_0 b_3 b_2 b_1 b_0 + \\ & a_3 a_2 a_1 b_3 b_2 b_1 b_0{}^* + a_3 a_1 a_0 b_1 b_0 + a_1 a_0 b_3 b_1 b_0 + \\ & a_3 a_2 a_1 a_0 b_3 b_2 b_1 b_0 + a_3 a_2 a_1 a_0 b_3 b_2 b_1 b_0 + a_3 a_2 a_0 b_3 b_2 b_1 b_0 + \\ & a_3 a_2 a_1 a_0 b_3 b_2 b_0\end{aligned} \quad (3.8)$$

-continued $$p_{8,4} = \bar{a_3}\bar{a_2}a_1a_0\bar{b_3}b_2b_1 + \bar{a_3}a_2a_1\bar{b_3}\bar{b_2}b_1b_0 + \bar{a_3}a_2a_1\bar{a_0}b_3 + \quad (3.9)$$
$$a_3\bar{b_3}\bar{b_2}b_1b_0 + a_3a_1b_3\bar{b_2}\bar{b_1} + a_3\bar{a_2}\bar{a_1}\bar{b_3}b_1 + a_2\bar{b_3}b_2\bar{b_1}\bar{b_0} +$$
$$\bar{a_3}a_2a_1\bar{a_0}\bar{b_2} + a_3\bar{a_2}\bar{a_1}\bar{a_0}b_1 + a_1b_3\bar{b_2}b_1\bar{b_0} + a_3\bar{a_2}\bar{a_1}b_1\bar{b_0} +$$
$$a_1a_0b_3\bar{b_2}\bar{b_1} + a_3a_2a_1\bar{b_3}b_2b_1b_0 + \bar{a_3}a_2a_1a_0b_3b_2\bar{b_1} +$$
$$a_2\bar{a_1}\bar{b_2}b_1b_0 + a_2\bar{a_1}\bar{a_0}b_2b_1 + a_3\bar{a_0}b_3b_2b_1b_0 + a_3a_2a_1a_0b_3\bar{b_0} +$$
$$a_3a_2a_1\bar{a_0}b_3b_0 + a_3a_0b_3b_2b_1\bar{b_0} + a_3\bar{a_2}\bar{a_1}a_0b_3b_1\bar{b_0} +$$
$$a_3\bar{a_1}a_0b_3\bar{b_2}b_1b_0 + a_3\bar{a_2}\bar{a_0}b_3\bar{b_2}b_1 + \bar{a_3}a_2a_1b_3\bar{b_2}b_0 +$$
$$a_3a_1\bar{a_0}\bar{b_3}b_1\bar{b_0} + a_3a_1\bar{a_0}b_3b_1b_0 + \bar{a_3}a_2\bar{a_1}a_0b_3\bar{b_2}b_1 +$$
$$a_3a_2a_1\bar{b_3}\bar{b_2}b_1b_0 + a_3a_2a_1\bar{a_0}b_3b_2b_1b_0 + a_3\bar{a_2}a_1\bar{a_0}b_3b_2b_1b_0 +$$
$$\bar{a_3}a_2a_1a_0b_3b_2b_1b_0 + a_3a_2a_1b_3b_2\bar{b_1} + a_3a_2a_1a_0b_3b_2\bar{b_1} +$$
$$a_3a_2a_1\bar{b_3}b_2b_1b_0 + a_3a_2a_1b_3b_1b_0 + \bar{a_3}a_1\bar{a_0}b_3b_2b_1 +$$
$$a_3\bar{a_2}a_1a_0b_3\bar{b_2}b_1b_0$$

$$p_{8,5} = a_3\bar{a_2}\bar{a_1}\bar{a_0}b_2 + a_2b_3b_2b_1b_0 + \bar{a_3}a_2\bar{a_1}\bar{a_0}b_3 + a_3b_3b_2b_1b_0 + \quad (3.10)$$
$$a_3a_2\bar{a_1}b_2b_0 + a_2a_0b_3\bar{b_2}\bar{b_1} + a_2\bar{a_1}b_3b_2b_1 + a_3\bar{a_2}\bar{a_1}b_2\bar{b_1} +$$
$$a_3a_2b_3\bar{b_2}\bar{b_1} + a_3a_2a_1b_3b_2 + a_3\bar{a_2}b_3b_2\bar{b_1} + a_3a_2a_1b_3b_2 +$$
$$a_3a_2b_3b_2b_1b_0 + a_3\bar{a_2}a_1a_0b_3b_2 + a_3a_2a_0b_3b_2\bar{b_0} +$$
$$a_3a_2a_0b_3b_2\bar{b_0} + a_3\bar{a_1}a_0b_3b_2\bar{b_1} + \bar{a_3}a_2a_1b_3\bar{b_1}\bar{b_0} +$$
$$a_3a_2a_1b_3b_2b_1 + a_3\bar{a_2}a_1b_3b_2b_1 + a_3a_2a_1b_3b_1b_0 +$$
$$a_3a_1a_0b_3b_2b_1 + a_3a_1a_0b_3b_1b_0 + a_3a_2a_1b_3\bar{b_1}\bar{b_0} +$$
$$a_2a_1a_0b_3b_2b_1 + a_3a_1a_0b_2b_1\bar{b_0} + a_2a_1a_0b_3b_1\bar{b_0} +$$
$$a_3a_1a_0b_2b_1b_0 + a_2a_1a_0b_3b_1b_0 + a_3a_2a_1a_0b_3b_1b_0^* +$$
$$a_3a_2a_0b_3b_2b_1\bar{b_0} + a_3a_2a_1a_0b_3\bar{b_2}b_0 + a_3a_2a_1\bar{a_0}b_3b_2b_1 +$$
$$a_3a_2\bar{a_1}b_3b_2b_1\bar{b_0} + a_3a_2a_0b_3b_2b_1b_0 + \bar{a_3}a_2a_1a_0b_3b_2b_0$$

$$p_{8,6} = a_3a_2b_3\bar{b_2} + a_3b_3\bar{b_2}b_1\bar{b_0} + a_3\bar{a_2}\bar{a_1}\bar{a_0}b_3 + a_3\bar{a_1}b_3\bar{b_2}\bar{b_1} + \quad (3.11)$$
$$a_3a_2a_1b_3\bar{b_1} + a_3a_2a_1b_3\bar{b_0} + a_3a_0b_3b_2\bar{b_1} + a_3a_2\bar{b_3}b_2b_1 +$$
$$a_3a_2a_1b_3b_2 + a_3a_2a_1b_2b_1^* + a_3a_1\bar{a_0}b_3\bar{b_2}b_0 +$$
$$a_3\bar{a_2}\bar{a_0}b_3b_1b_0 + \bar{a_3}a_2a_1a_0b_3b_1 +$$
$$a_3a_1\bar{b_3}b_2b_1b_0 + a_3a_1a_0b_3b_2b_1 + a_3a_2a_1b_3b_1b_0 +$$
$$a_3a_2a_1\bar{b_3}b_2b_0 + a_3a_2a_0b_3b_2b_1 + a_3a_2a_1a_0b_2b_0 +$$
$$a_2a_0b_3b_2b_1b_0 + a_3a_2a_0b_3b_2b_0 + a_3a_2a_0b_3b_2b_0$$

$$p_{8,7} = a_3a_2a_0b_3b_1 + a_3a_1b_3b_2b_0 + a_3a_2a_1b_3b_1 + a_3a_1b_3b_2b_1 + \quad (3.12)$$
$$a_3a_2b_3b_2 + a_3a_2b_3b_1b_0 + a_3a_1a_0b_3b_2 + a_3a_0b_3b_2b_1b_0 +$$
$$a_3a_2a_1a_0b_3b_0$$

Terms marked with an asterisk, such as $a_3a_2a_1a_0b_2b_1^*$ in equation (3.11), denote that a choice exists in selecting terms to satisfy the covered minterm. Typically, these are terms that were needed to cover one or two minterms that had not been covered by larger Boolean combinations, and multiple equally efficient options existed for including the minterms in a suitable combination.

Equations (3.9)–(3.12) are denoted as $p_{8,y}$ because they each represent a Boolean expression for the yth bit of an 8-bit product (i.e. the product of a 4-bit by 4-bit multiplication). These terms are subsets of expressions for multiplications of higher order. Because of this fact, the equations for the products of order less than n in an n-bit by n-bit multiplication, are universal (equations (3.2), (3.4), (3.7), and (3.8)).

Comparing equations (3.7) and (3.6) (which also appears in Gaskill ) shows that while (3.6) is much easier to implement and requires less space than an implementation of (3.7), equation (3.7) is clearly two logic levels while Gaskill actually realized (3.6) with three logic levels (the outputs of two XORs feeding into a final XOR). Where timing is concerned, equation (3.1), and Gaskill's system modeled after it, require more levels of gate delay as the product bit becomes more significant. The flat Boolean multiplier remains a two gate delay device for all output bits.

Two's complement multiplications produced different alternative Karnaugh maps than unsigned multiplication and, therefore, produced different Boolean expressions for product bits of order equal to or greater than n ($p_i$, where $i \geq n$). This difference is due to the effect of the sign bits in forming the two's complement result. The Boolean expression for the higher order products for a 4-bit by 4-bit, 2-gate delay, two's complement multiplier are listed in the following equations. The product terms denoted with a superscript minus sign, $p^-$, differentiates a two's complement product term from a unsigned product term.

$$p^-_{8,4} = a_3b_3\bar{b_2}b_1b_0 + \bar{a_3}a_2\bar{a_1}a_0b_3 + a_3b_3b_2b_1b_0 + a_3\bar{a_2}a_1\bar{a_0}b_3 + \quad (3.13)$$
$$a_3a_2a_1\bar{a_0}b_2 + a_2b_3b_2b_1b_0 + a_3a_2b_3b_2b_1^* + a_3\bar{a_2}a_1b_3b_2^* +$$
$$a_3a_2a_1b_3b_2 + a_3a_2b_3b_2b_1 + a_3a_2a_1b_1b_0 + a_1a_0b_3\bar{b_2}b_1 +$$
$$a_3a_1\bar{b_3}b_2b_1b_0 + a_3a_2a_1a_0b_3b_1 + a_2a_1b_3b_2b_1b_0 +$$
$$a_3a_2a_1a_0b_2b_1 + a_3a_2a_1a_0b_2b_1 + a_2a_1b_3b_2b_1b_0 +$$
$$a_3a_2a_1a_0b_1\bar{b_0} + a_1\bar{a_0}b_3b_2b_1b_0 + a_3a_2a_1a_0b_3\bar{b_1} +$$
$$a_3\bar{a_1}b_3\bar{b_2}b_1b_0 + a_3a_2a_1b_3b_1b_0 + a_3a_1a_0b_3b_2\bar{b_1} +$$
$$a_2a_1a_0b_2b_1b_0 + \bar{a_3}a_2\bar{a_1}b_3b_2\bar{b_1} + \bar{a_3}a_2\bar{a_1}b_3b_2b_0 +$$
$$\bar{a_3}a_2a_0b_3b_2\bar{b_1} + a_3a_2a_0b_3b_2\bar{b_1}^* + a_3a_2a_1b_3b_2b_0^* +$$
$$a_3a_1a_0b_3b_2b_1^* + a_3a_2a_1b_3b_1\bar{b_0}^* + a_3a_2a_1b_3b_2b_1b_0 +$$
$$a_3a_2\bar{a_1}\bar{a_0}b_3b_2b_1 + a_3a_2a_1\bar{a_0}b_3b_2b_1 + a_3a_2a_1b_3b_2b_1\bar{b_0} +$$
$$a_3a_2a_1a_0b_2b_1b_0^*$$

$$p^-_{8,5} = a_3b_3b_2b_0 + \bar{a_3}a_2a_0b_3 + a_3b_3\bar{b_2}b_1 + a_3a_2a_1b_3 + \quad (3.14)$$
$$a_3b_3b_2b_1b_0 + \bar{a_3}a_2a_1\bar{a_0}b_3 + a_3a_2b_3b_2 + a_3a_2b_3b_2 +$$
$$a_3a_1a_0b_3b_2b_0^* + a_3a_2a_0b_3b_1b_0^* + a_3a_2a_1b_3b_1 +$$
$$a_3a_1b_3b_2b_1 + a_3\bar{a_2}\bar{a_1}a_0b_3b_2 + a_3a_2b_3b_2b_1b_0 +$$
$$\bar{a_2}a_1b_3b_2b_1 + a_3a_2a_1b_2b_1 + a_3a_2a_1b_2b_1^* +$$
$$\bar{a_3}a_2a_1a_0b_2b_0^* + a_2a_0b_3b_2b_1b_0^* + a_3a_2\bar{a_1}a_0b_2b_1b_0 +$$
$$a_2a_1a_0b_3\bar{b_2}b_1b_0 + a_3\bar{a_2}\bar{a_0}b_2b_1b_0^*$$

$$p^-_{8,6} = a_3b_3b_2 + a_3b_3b_1 + a_3b_3b_0 + a_3a_2b_3 + a_3a_1b_3 + a_3a_0b_3 + \quad (3.15)$$
$$a_3a_2a_1a_0b_3b_2b_1b_0$$

$$p^-_{8,7} = a_3b_3b_2 + a_3b_3b_1 + a_3b_3b_0 + a_3a_2b_3 + a_3a_1b_3 + a_3a_0b_3 \quad (3.16)$$

Equation (3.16) represents the sign bit of the product and are determined by the following rules for multiplying signed numbers:

1. Numbers of the same sign yield a positive product.
2. Numbers of different sign yield a negative product.
3. Any number times zero yields a product of zero, which is denoted as positive.
3. Any number times zero yields a product of zero, which is denoted as positive.

Because of these rules, the MSB of all n-bit by n-bit two's complement multiplications can be expressed as:

$$p^-_{2n,2n-1} = a_{n-1}b_{n-1}(b_{n-2}+b_{n-3}+\ldots+b_1+b_0)+a_{n-1}b_{n-1}(a_{n-2}+a_{n-3}+\ldots+a_1+a_0) \quad (3.17)$$

The next most significant bit, $2n-2$, contains sign extension bits from the MSB and the product term from the most significant negative number multiplication as discussed previously. Because of this, the $2n-2$ product bit of an n-bit by n-bit two's complement multiplication can be expressed as:

$$p'_{2n,2n-2}=a_{n-1}\overline{b_{n-1}}(b_{n-2}+b_{n-3}+\ldots+b_0)+\overline{a_{n-1}}b_{n-1}(a_{n-2}+a_{n-3}+\ldots+a_0)+a_{n-1}a_{n-2}a_{n-3}\ldots a_1a_0\overline{b_{n-1}b_{n-2}b_{n-3}\ldots b_1b_0}$$

Equations (3.17) and (3.18) can be combined to produce a simplified expression for bit 2n−2 of the two's complement product.

$$p'_{2n,2n-2}=p'_{2n,2n-1}+\overline{a_{n-1}a_{n-2}a_{n-3}\ldots a_1a_0}\overline{b_{n-1}b_{n-2}b_{n-3}\ldots b_1b_0} \quad (3.19)$$

Gaskill used the XOR of the most significant input bits for an expression slightly different (but equivalent) to equations (3.15) and (3.16), the most significant two's complement output bits. Gaskill does not, however, give equations for the general case of the MSBs of all two's complement products, equations (3.17), (3.18), and (3.19).

After the Boolean expressions were derived, they were checked by filling in blank K-maps based on the Boolean expression. The maps produced in this manner were then compared to the computer generated maps to verify the accuracy of the expressions.

C. Summary

Karnaugh-maps representing the output bits (product) of both unsigned and two's complement multipliers were generated and Boolean expressions for each bit were developed. Product terms of magnitude less than n (i>n for product bit $p_{2n,i}$ of an n-bit multiplier), are shown to be identical for both unsigned and two's complement cases based on the K-maps produced. Further, the product terms of order zero to three derived in this work (equations (3.2), (3.4), (3.7), and (3.8)) are universal for all unsigned multiplications and two's complement multiplications of order 4-bit by 4-bit or larger.

The expressions for the two least significant product bits for all multiplications, $p_0$ and $p_1$, are known from the Boolean expression defined in equation (3.1). The other terms can be developed from this expression but have been derived from K-maps for this research.

The rules of multiplying signed integers and a proof from the Background of Boolean Multipliers lead to simple terms for the most significant bits of the two's complement multiplication, as verified by the Karnaugh maps. These terms are defined for all cases in equations (3.17), (3.18), and (3.19).

All Boolean expressions were checked by generating Karnaugh-maps from the expressions and comparing to the multiplication based, computer generated K-maps.

RESULTS AND FINDINGS

A. Introduction

Developing the Boolean expressions for the 4-bit multiplier demonstrates that producing the terms is a tedious but trivial exercise. The techniques employed are covered in introductory digital logic classes. The greater challenge is in applying this research to larger multiplication functions that will produce complex Karnaugh maps and long Boolean expressions. The applicability of this design technique is as important as the production of the Boolean terms.

The first problem when applying this research to larger multipliers is whether the improved speed of the multiplier is worth the obvious increase in circuit complexity, i. e. the trade-off between circuit speed and circuit complexity. This section will address the relative complexity of the 4-bit Boolean multiplier compared to the classic 4-bit parallel multiplier. This comparison will include investigation of gate sharing and the possibility of economizing by producing a 3-gate delay version of the Boolean multiplier and will discuss the challenges of gate size and transport delay.

The problem of producing the design for larger inputs, the growth of problem complexity, is considered next. This section investigates producing the K-maps and managing the increased number of minterms for larger n-bit multipliers and the trade-off between the K-map generating method used for the 4-bit case and the method of producing the Boolean expressions by direct manipulation of equation (3.1).

Section D of this section documents a related finding from this research, a mathematical curiosity involving the $p_1$ bit of the output.

Finally, the summary will list the accomplishments of this research.

B. Trade-off between Circuit Speed and Circuit Complexity

The Boolean expressions describing this fast multiplier represent a non-cellular, non-symmetrical design. The design is also difficult to verify because of the irregular nature of the Boolean expressions. These facts describe a complex design when compared to the simple parallel multiplier design. The parallel multiplier, without Wallace tree reduction, is both cellular and symmetrical but represents a gate delay on the order of 4n for designs using exclusively 2-input gates. This is due to one the gate delay for the partial products, then three gates delays for each carry, propagating from the least significant addition (not the LSB) to the addition that produces the MSB of the product. (A parallel multiplier utlizing three-input gates can be designed with only 3n gate delays.)

Figure 22:
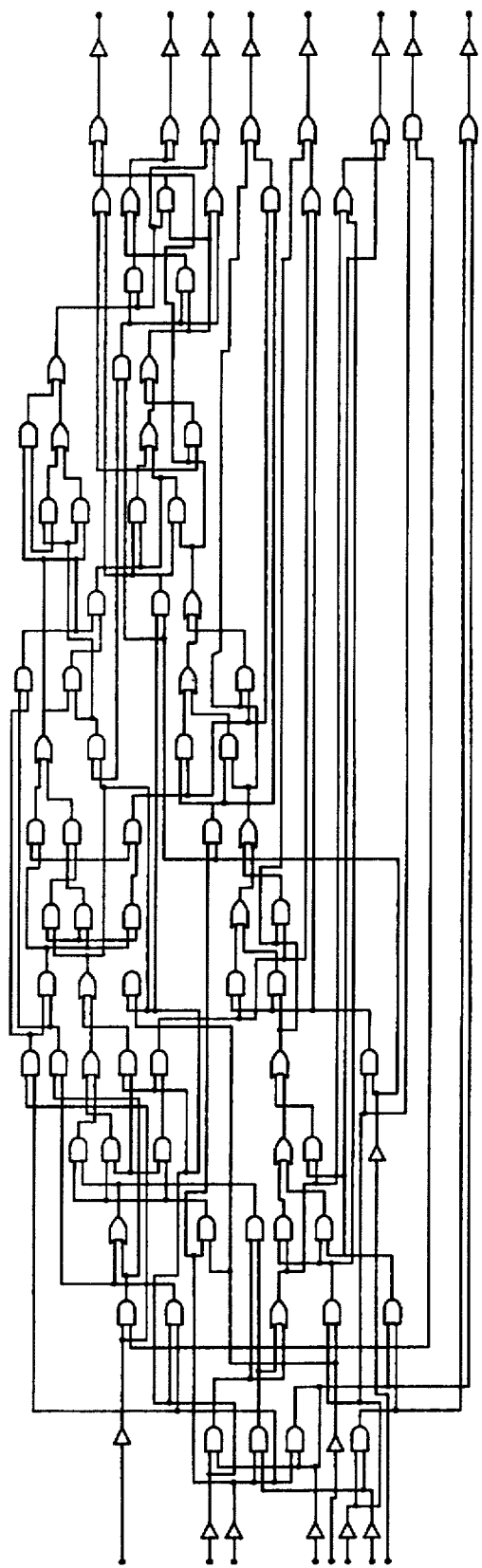
FIG. 22 is a 4-bit Parallel Multiplier without Wallace/Dadda Reduction.

The example in FIG. 22 does not clearly show the symmetry of the parallel multiplier but does confirm that the 4-bit by 4-bit case requires 80 two-input logic gates and produces a delay of at least 16-gates. J. V. Oldfield, R. C. Dorf, *Field Programmable Gate Arrays*, John Wiley and Sons, p168, 1995. The delay problem in traditional multipliers is complicated by the fact that the most significant digits suffer the longest delay. In multipliers using Wallace/Dadda reduction, the delay is decreased but the most significant bits still have the longest delay. This problem is notable in floating point ALUs (Arithmetic Logic Unit) where bits of lessor significance may be discarded.

Large counters and CLAs (Carry Look-Ahead Adder) are needed to provide the fast reduction of the partial products in the Wallace/Dadda multipliers to help reduce the delay. As the bit count increases, the CLAs grow more complex and as the reduction rate (number of bits simultaneously combined) increases, the counters become larger and more complex. As an example, Dadda defines the (3,2) adder as a full adder, i. e. 3 bits of equal magnitude are combined into two outputs. L. Dadda, "Some Schemes for Parallel Multipliers," *Alta Frequenza*, Volume 34, 1965, pp.349–365. The full adder requires 2 XOR, 3 AND, and one three input OR gate to implement. A slow (7,3) counter (seven bits of equal magnitude combined into three outputs) requires at least four times the circuitry and chip area as a (3,2) counter. W. J. Stenzel, W. J. Kubitz, G. H. and Garcia.: "A Compact High-Speed Parallel Multiplication Scheme," *IEEE Transactions on Computers*, C-26: pp948–957, 1977. The faster that the result of a large counter (such as the (7, 3) counter) is needed, the greater the complexity and gate count. A relatively fast (7, 3) counter requires the XOR of all inputs to product the least significant output ($s_0$), the XOR of 21 two-digit AND terms for $s_1$, and the OR of 35 four digit AND terms for $s_2$. This problem has led to research in the area of majority gates. The decision for designers to consider is not between slow, low gate count parallel multipliers and the Boolean design, but between fast complex pipelined multipliers and the larger, faster Boolean multiplier design.

The choice between speed and space is well known. Brent and Kung approximated the relationship between multiplier speed and chip area by:

$$\left(\frac{A}{A_0}\right)\left(\frac{T}{T_0}\right)^{2r} \geq n^{1+\alpha} \quad (4.1)$$

where $\alpha=0$ or 1 and where $A_0$ and $T_0$ are positive constants for chip area and process time that are technology dependent but independent of n, the number of input bits. R. P. Brent and H. T. Kung, "The Area-Time Complexity of Binary Multiplication," *Journal of the Association for Computing Machinery*, Volume 28, No. 3, pp 521–534, July 1981. This relationship shows the size of the multiplier growing exponentially to the number of bits, and the time increasing as the bit count increases. This relationship is based on chip area and considers all circuit elements as two-input gates with a constant area and delay with simplified conductor geometries.

For the Boolean multiplier, if and $A_0$, $T_0$, and T are treated as constants (two gate delays regardless of multiplier size), then as n grows the chip area, A, increases more than exponentially ($\geq n^2$). If the Boolean multiplier is compared to other designs, the relationship approximates $A_B T_B = A_i T_i$, where $A_B$ and $T_B$ are the area and processing time for the Boolean multiplier and $A_i$ and $T_i$ are the area and processing time for the other design. This relationship agrees with equation (4.1) when $\alpha=0$ and $A_0$ and $T_0$ are treated as constants and is confirmed by the comparisons made in FIG. 23.

Figure 25:
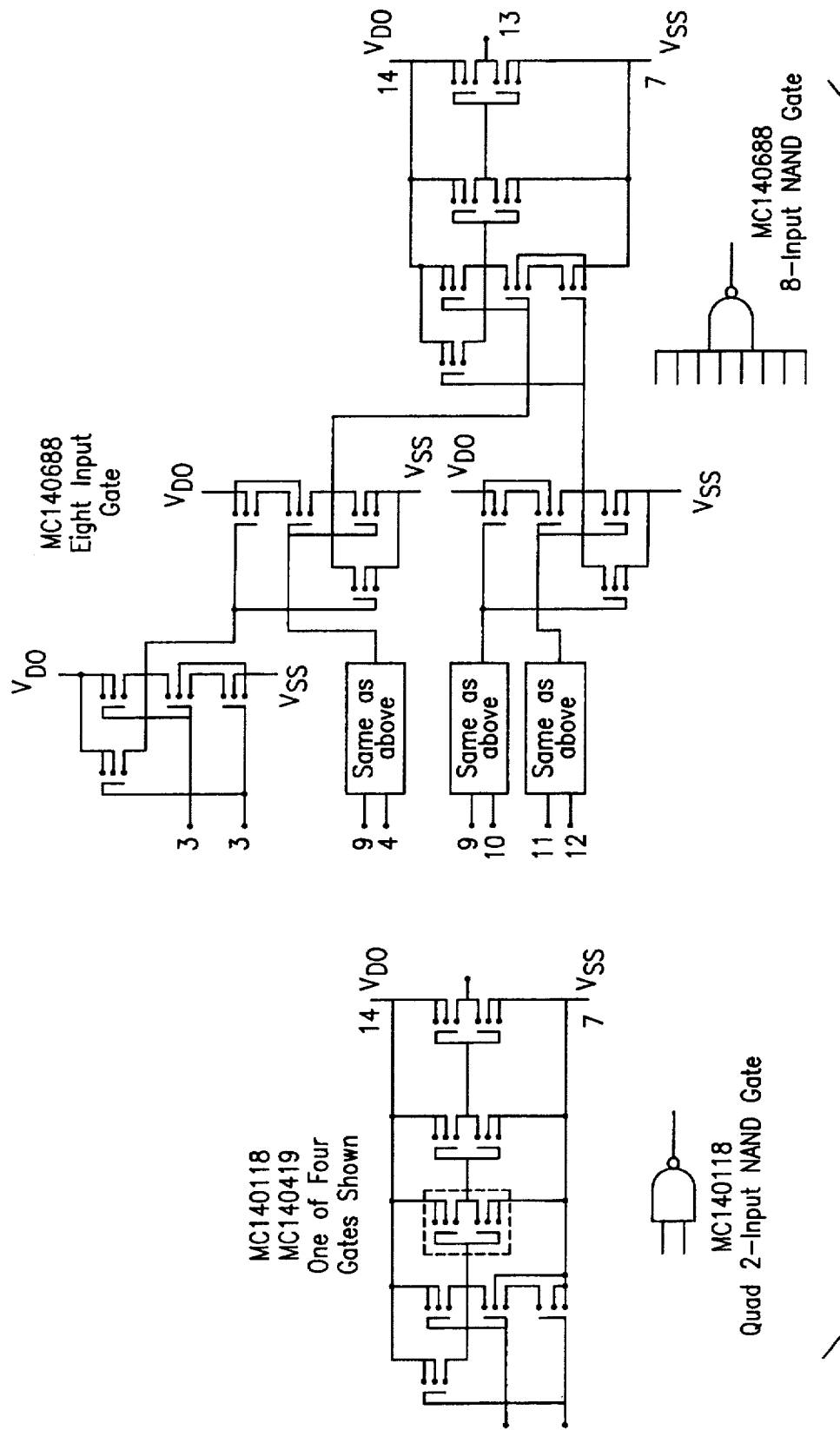
FIG. 25 is a Comparison of 2-input and 8-input CMOS Gates.

The Boolean multiplier depends upon the use of up to 2n-input AND gates with large OR gate combinations. These devices exist and are at least as space efficient (per input) as two-input gates. Eight-input TTL gates do not require much more space than two-input versions because of the use of diodes to the input transistor (see FIG. 24). *The TTL Data Book*, Volume 2, pp 3-3 to 3-8 and 3-139 to 3-144, Texas Instruments Incorporated, Austin, Tex., 1985. In TTL, an eight-input gate requires approximately 30–50% more space than a two-input gate of the same function (a 300% increase in capability). CMOS grows nearly linearly with the addition of inputs to a gate (see FIG. 25). *CMOS Logic Data*, pp 6-5 to 6-11, Motorola Inc., Phoenix, Ariz., 1991.

In both the 2-input and the 8-input CMOS NAND gates, the average transistor count is four transistors per input. An approximation of four transistors per input per gate is reasonable based on these comparisons. Propagation delays are the same, in both CMOS and TTL, for large (eight-input) or small (two-input) gates of the same function.

Timing delays for this work are based on switching propagation delay of logical gates being constant. Within a logic technology, this assumption is usually accepted. *The TTL Data Book*, Volume 2, pp 3-3 to 3-8 and 3-139 to 3-144, Texas Instruments Incorporated, Austin, Tex., 1985; *CMOS Logic Data*, pp 6-5 to 6-11, Motorola Inc., Phoenix, Ariz., 1991; D. G. Fink and D. Christiansen (ed.), *Electronics Engineers' Handbook*, Third Edition, McGraw-Hill, p 8-92, 1989.

The primary method of compromising between speed and area is to combine terms and add one layer of delay. Because of the symmetry of multiplication, this technique is especially useful. Since multiplication is commutative (A×B=B×A), every logical term has a complementary term. That is, if $a_0 b_1$ exists in an expression, $a_1 b_0$ must also exist in the expression (as indeed they do in equation (3.4)).

Let a subterm be the part of a logical term that is contributed from one operand. In the $a_3 a_2 b_3 b_2 b_0$ term from equation (3.12), $a_3 a_2$ is the a-subterm and $b_3 b_2 b_0$ is the b-subterm. The Boolean expressions defined in equations (3.7) through (3.16) can be expressed as sets of ANDed subterms, thus adding one gate delay and eliminating the need for AND gates with more than five inputs.

Subterms of size two, three, and four were considered for economizing. FIGS. 26–28 show the results of investigating the occurrences of the various subterms. In these tables, all the possible subterms for the element size are accounted for and categorized by the number of instances. The number of instances of each subtem dictates the area economy to be gained by grouping terms.

The subterms that are only used once receive no economy from being gated as a subterm, so these are formed at the AND gate (middle level in a three-level logic design) with their complementary subterm.

For the unsigned 4-bit multiplier, producing subterms by adding a third layer of logic will reduce the circuit area as detailed in FIG. 29. These numbers represent a reduction in circuit complexity and circuit area of about 30–40% and an increase in delay of about 50%.

The same approach could be extended to a four-gate delay since many of the 3-bit and 4-bit subterms can be expressed as combinations of smaller terms.

A comparison of transistor count was produced using the approximation of four transistors per input per gate and compared to baseline designs in FIG. 23. The multipliers listed in FIG. 1 were used as baseline for existing designs. The designs from references D. Somasekhar and V. Visvanathan, "A 230 MHz Half-Bit Level Pipelined Multiplier Using True Single-Phase Clocking," *IEEE Transactions on VLSI Systems*, Volume 1, number 4, December 1993, pp 415–422 and T. G. Noll, D. Schmitt-Landsiedel, H. Klar, and G. Enders, "A Pipelined 330-MHz Multiplier," *IEEE J. of Solid-State Circuits*, Volume 21, pp 411–416, June 1986 are both relatively modern 8-bit by 8-bit pipelined designs. Since the growth of multiplier area is known to be exponential compared to increase in operand size, dividing the transistor count of the baseline designs by four gives an average size of about 1,300 transistors.

Including OR gate and buffers, the two logic level Boolean multiplier would require 4,156 transistors to realize, or slightly more than triple the chip area. The three logic level Boolean multiplier requires 2,864 transistors or more than double the area of the baseline designs. Both baseline designs rely on pipelining to achieve high throughput and actually have a gate delay of order 4n, for an n-bit input, for the first multiplication product. Table 4.5 directly compares the designs.

Another useful approach is to incorporate selected parts of the Boolean multiplier into a conventional multiplier. If the Boolean expressions are used only for the most significant digits, a moderate speed increase can be realized without as great an increase in area as using the full Boolean approach. Hybridizing the multiplier is attractive because of the great improvement in returning the MSB.

Finally, floating point and double precision multipliers that discard least significant bits can be greatly improved, since only the expressions for the required product bits are required.

C. Growth of Problem Complexity

A Karnaugh map, by definition, accounts for every possible input combination for a set of digital inputs. For an n-bit by n-bit multiplier, there are 2n inputs and 2n outputs. Each output bit represents one expression and therefore one Karnaugh map. The number of inputs for a term, and its related K-map, is determined either by the multiplier size or the significance of the product bit, whichever is larger. Where x is the number of input bits for product term $p_i$:

$$x=\text{minimum}(2(i+1), 2n) \quad (4.2)$$

Including OR gate and buffers, the two logic level Boolean multiplier would require 4,156 transistors to realize, or slightly more than triple the chip area. The three logic level Boolean multiplier requires 2,864 transistors or more than double the area of the baseline designs. Both baseline designs rely on pipelining to achieve high throughput and actually have a gate delay of order 4n, for an n-bit input, for the first multiplication product. Table 4.5 directly compares the designs.

Another useful approach is to incorporate selected parts of the Boolean multiplier into a conventional multiplier. If the Boolean expressions are used only for the most significant digits, a moderate speed increase can be realized without as great an increase in area as using the full Boolean approach. Hybridizing the multiplier is attractive because of the great improvement in returning the MSB.

Finally, floating point and double precision multipliers that discard least significant bits can be greatly improved, since only the expressions for the required product bits are required.

C. Growth of Problem Complexity

A Karnaugh map, by definition, accounts for every possible input combination for a set of digital inputs. For an n-bit by n-bit multiplier, there are 2n inputs and 2n outputs. Each output bit represents one expression and therefore one Karnaugh map. The number of inputs for a term, and its related K-map, is determined either by the multiplier size or the significance of the product bit, whichever is larger. Where x is the number of input bits for product term $p_i$:

$$x=\text{minimum}(2(i+1), 2n) \quad (4.2)$$

Since the n−1 lessor order bits are either defined from multipliers with lower bit count, or can be derived with a smaller K-map, this discussion will concentrate on the n+1 maps with 2n inputs, also referred to as complete maps. Each of these maps display $2^{2n}$ minterms, requiring $2^{2n}$ multiplications to complete. For the 4-bit case, the number of multiplications required and the size of the maps is trivial. The 8-bit cases were computed, although the Boolean expressions have not been derived for this case. The problem of magnitude becomes obvious when considering the 8-bit Karnaugh maps with 65536 minterms each. Even this magnitude seems insignificant when compared to a 32-bit multiplier that requires over $18 \times 10^{18}$ multiplications just to populate the K-maps.

Further complicating the problem is the fact that larger order multipliers require more Karnaugh maps. An 8-bit by 8-bit multiplier requires 16 K-maps, 9 of which are complete, each having $2^{16}$ terms. A 32-bit by 32-bit multiplier requires 64 K-maps, the 33 largest of these having $2^{64}$ terms. So that the number of terms, m, in the complete K-maps of an n-bit by n-bit multiplier is:

$$m=(n+1)2^{2n} \quad (4.3)$$

The 32-bit problem, and larger multipliers, will be required for this design to have practical application in current generation processors. The K-map method will not be satisfactory for such large multipliers since just producing the minterms could take years (over 500 years at 1 billion multiplications per second). Once the K-maps are generated, reduction of the Boolean expression must be reliably automated to have any hope of completion.

Using a computer program to generate the Boolean expressions by expanding equation (3.1) is another approach to producing the Boolean expressions for large multipliers. The problem with this method is that the complexity of the Boolean multiplier still explodes. When flattening an XOR expression to two level logic, the number of terms in the final expression is at least 2 raised to the power of the number of XORs. This growth is due to the fact each XOR represents each term ANDed with the inverse of the other term, then the results of those AND terms ORed together. As examples:

$$A \oplus B = \overline{A}B + A\overline{B} \quad (4.4)$$

$$A \oplus B \oplus C = \overline{ABC} + \overline{A}B\overline{C} + A\overline{BC} + ABC \quad (4.5)$$

$$A \oplus B \oplus C \oplus D = \overline{ABCD} + \overline{A}BCD + \overline{AB}CD + A\overline{BC}D + \overline{ABC}D + AB\overline{C}D + ABC\overline{D} + ABCD \quad (4.6)$$

From equation (3.1), each complete product term, $p_n$, is the sum of n+1 partial product bits and $\lfloor \log_2 n \rfloor$ carry terms. The minimum number of product terms, $t_n$, to be ORed together in the flattened expression is:

$$t_n \geq 2^{(n+\lfloor \log_2 n \rfloor)} \quad (4.7)$$

Equation (4.6) is based on the expansion of the XOR operation on simple terms. The carry terms usually have multiple elements ORed together, each element having multiple subterms. The resulting sum of product expressions will have more product terms than the limit described in (4.7) ($t_2=8$ but $p_2$ has eleven terms, $t_3=16$ but $p_3$ has 36 terms). This limit demonstrates that the solution to a two level Boolean multiplier becomes too large to realize ($t_{16}=2,097,152$, for example). Since the products are obviously larger than this limit, producing two gate delay Boolean expressions for larger multipliers is impractical even using a computer program to expand equation (3.1).

A possible alternative is to pursue four logic level Boolean multiplier designs, or even designs with more than four gate delays. Splitting a long XOR expression before flattening yields two much more efficient expressions to be XORed for the final output (three logic levels). Dividing a large product expression (based on equation (3.1)) into four manageable pieces reduces the complexity of the circuit by orders of magnitude while only adding two gate delays. Because of the relationship of the number of XORs to the number of terms in the final expression, flattening pieces of the total product expression reduces complexity significantly for each level of delay added.

Boolean multipliers with more logic levels can still achieve the goal of a single-cycle multiplier. Techniques and algorithms for producing the most efficient four gate delay expression would have to be developed.

D. Related Result

For any binary number, A, and binary product $P=A^2$, the next least significant bit of the product, $p_1=0$.

This theorem is easily proved from equation (3.4) that defines bit $p_1$ of the product of binary multiplication:

$$p_1=a_0b_1 \oplus a_1b_0 \quad (3.4)$$

Since A=B for the squaring operation, the equation becomes a case of XORing a term with itself, which always yields zero:

$$p_1=a_0a_1 \oplus a_1a_0=0 \quad (4.8)$$

This theorem makes designing a digital squaring device a little simpler.

DISCUSSION AND CONCLUSIONS

The issue of whether a Boolean multiplier is feasible has been addressed. The answer to that determination is dependent on the application. It is obvious that a 4-bit by 4-bit multiplier can be built with either 2-level or 3-level logic. The cost, in terms of chip area and design time is higher, however, than for current multipliers. For most low end applications, such as 8-bit microcontrollers operating at less than 10 MHz, the Boolean multiplier offers no real advantage and is not a reasonable design choice. Most uses of computers in consumer products and control systems have a limited need for multipliers, and the advantage of completing a multiplication an order of magnitude faster is minimal.

As an example, the PIC series of microprocessors produced by Microchip Corporation, has not included a device with a multiplier until recently. Even when the need for built-in multiplication capability arises, designs exist for 8-bit multipliers that can produce a result in a single clock cycle at 5 MHz (200 ns).

Even in personal computers, with clock frequencies now at or above 100 MHz, the need for faster multiplication capabilities does not appear to be a major concern.

Applications that could profit from very fast multipliers are systems that meet at least some of the following:

1. Systems that process code with extensive mathematical operations, such as scientific modeling, that could benefit from increased multiplication throughput.

2. Designs where chip area, or chip cost, is not a major factor and Multi-Chip Modules (MCM) are acceptable.

3. Situations where resources could be committed to the process of generating and confirming the extensive logical expressions.

The most obvious application is in supercomputers and mainframes used in scientific and engineering research. Even in large parallel processor architectures, problems that require the manipulation of large multi-dimensional arrays can be processed faster using a Boolean multiplier. The capability of producing a result in less than a clock cycle also simplifies the design of the instruction decoding and scheduling systems.

As mentioned earlier, systolic arrays and digital neural networks could realize an improvement in throughput due to the heavy dependence on multipliers in these systems. The Boolean multiplier, or a hybrid multiplier, could even find a niche in engineering workstations and high-end personal computers. Applications like finite element analysis (FEA) and computer automated design (CAD) often contain routines that may take hours to run. In the case of FEA, most of the delay is created by the iterative nature of the algorithms adjusting each element to reflect the values of its immediate neighbors, a process that is heavily multiplication dependent.

Boolean multipliers, once developed, could reside on a separate chip inside an MCM with the processor. MCMs are now being experimented with as a possible packaging standard for future processors.

A. Alternative Application

1. Elimination of Terms

An additional option for this generating program could be the elimination of terms greater than n−1 in the equations for n-bit multipliers. These terms do not affect the accuracy of the equation and are unnecessary. Manually deleting the terms is time consuming.

2. Boolean Division and Other Functions

The inverse of multiplication is a prime candidate for reduction to Boolean terms. Division, although not usually considered a discrete operation, actually also has a finite number of possibilities for and n-bit by n-bit input. If the most significant digits of the operands are aligned, the number of possibilities is reduced by eliminating leading zeros (or leading ones for negative two's complement numbers). Karnaugh maps can be produced for small word size dividers just as easily as for small word size multipliers. Additional bits of accuracy is only a matter of producing more K-maps.

A general equation for division quotient bits, comparable to (3.1) for multiplication, may also be possible. Division is a compare and subtract process, where multiplication is based on an AND then add process. Because of this, the problem of Boolean division probably explodes in the same manner as Boolean multiplication. A Boolean equation generating program is also be possible for division.

Carry-Look-Ahead adders (CLAs) are prime candidates for true Boolean representation. An n-bit by n-bit adder only requires n+1 outputs and therefore only n+1 Karnaugh maps, with only the two most significant having $2^{2n}$ terms. A two gate delay adder could be used not only as an improved adder, but also to improve Wallace tree reduction of partial products in state of the art multipliers.

If single cycle multiplication and division are both realized, all four basic mathematical operations could be accomplished in the same time period, making system performance more predictable. Boolean division may also share some subterms with Boolean multiplication, giving opportunity for area economy.

3. Four Level Logic Multiplier

Developing a Boolean multiplier with more than two gate delays can economize chip area while still achieving the goal of a single-cycle multiplier. Splitting a long XOR expression before flattening yields two much more efficient expressions to be XORed for the final output (three logic levels). Dividing a large product expression (based on equation (3.1) into four manageable pieces reduces the complexity of the circuit by orders of magnitude while only adding two gate delays.

B. Conclusion

1. This design is a fast digital multiplier for 4-bit (or smaller) binary numbers, both unsigned and signed numbers (in two's complement format) may be multiplied by the two designed described. The designs share the least significant nibble (LSN), but have different most significant nibbles (MSN).

2. This design represents the fastest possible multiplier (two gate delays, or two logic levels) for 4-bit by 4-bit multiplication. Because of the limits of basic Boolean functions and digital logic gates, a one gate delay multiplier is impossible, hence, this design represents the fastest possible multiplier.

3. The part of this device that produces the least significant nibble product (the four lesser significant bit products, expressed as $p_0$, $p_1$, $p_2$ and $p_3$) is valid for all unsigned multiplications, regardless of operand size and is valid for all two's complement multiplications with operandi of 4-bit size and larger. This allows this part of the device to be used in larger bit size fast multipliers.

4. Equations are defined that describe the construction of fastest possible devices to produce the MSB (Most Significant Bit) and NMSB (Next Most Significant Bit) products for all two's complement multipliers. This part of the multiplier is applicable to all two's complement multipliers. (This claim may not be patentable based on the Gaskill patent. Gaskill gave similar equations, but the Gaskill equations are not correct!)

5. This device produces the multiplication products without generating partial products and produces every product bit independently. This allows parts of the device to be used to produce individual product bits, if necessary, without producing unneeded terms and partial products. The device represents a divergence from current design methodology in that partial products are not generated and then added. Instead, the device is based on the Boolean expression for each product bit.

6. The Boolean expressions can be combined and simplified to produce multipliers that have more gate delays or more logic levels, but require less circuitry to implement. Thus producing a three, four, five or more gate delay fast multiplier that requires much less space but still represents a great improvement in speed and still produces all product terms independently. This allows a design with sufficient computational speed without using unnecessary circuit complexity. Any 4-bit by 4-bit Boolean multiplier, regardless of the number of gate delays, is a derivative of this design and based on the Boolean equations described.

I claim:

1. A boolean multiplier for producing results of a binary multiplication with only two logic gate delays, comprising:

a plurality of input buffers for storing a first operand and a second operand;

a first set of gates coupled to the input buffers, the first set of gates respectively combining the first operand and the second operand with Boolean functions to produce logical products; and a second set of gates coupled to the first set of gates, the second set of gates respectively combining the logical products with Boolean functions to produce specific product bits;

wherein partial products are not generated by the boolean multiplier.

2. The multiplier according to claim 1, wherein the first set of gates are NAND gates and the second set of gates are NAND gates.

3. The multiplier according to claim 1, wherein the first set of gates are AND gates and the second set of gates are OR gates.

4. The multiplier according to claim 1, wherein the multiplier is a two's complement multiplier.

5. The multiplier according to claim 4, wherein the multiplier is a 4-bit by 4-bit multiplier and the Boolean expression for the product bits are as follows:

$$p_0 = a_0 b_0$$

$$p_1 = a_0 b_1 \oplus a_1 b_0$$

$$p_2 = a_2 a_1 a_0 b_0 + a_0 b_2 b_1 b_0 + a_2 b_2 b_1 b_0 + a_2 a_1 a_0 b_2 + a_2 a_0 b_2 b_0 +$$
$$a_2 a_0 b_2 b_0 + a_2 a_1 a_0 b_1 + a_1 b_2 b_1 b_0 + a_1 a_0 b_1 b_0 +$$
$$a_2 a_1 a_0 b_2 b_0{}^* + a_2 a_0 b_2 b_1 b_0{}^*$$

-continued $$p_3 = a_3 \overline{b_3} \overline{b_2} \overline{b_1} b_0 + \overline{a_3} \overline{a_2} \overline{a_1} a_0 b_3 + a_2 \overline{b_3} \overline{b_2} b_1 \overline{b_0} + \overline{a_3} \overline{a_2} a_1 \overline{a_0} b_2 +$$
$$\overline{a_3} a_0 b_3 \overline{b_2} \overline{b_1} + a_3 a_2 a_1 \overline{b_3} b_0 + a_0 \overline{b_3} \overline{b_2} b_1 \overline{b_0} + \overline{a_3} a_2 a_1 a_0 b_0 +$$
$$a_1 \overline{b_3} \overline{b_2} \overline{b_1} \overline{b_0} + \overline{a_3} a_2 \overline{a_1} \overline{a_0} b_1 + a_3 a_2 a_0 \overline{b_3} b_2 b_1 + a_3 a_2 a_1 \overline{b_3} b_2 b_0 +$$
$$\overline{a_2} a_0 b_3 b_1 \overline{b_0} + a_3 a_1 \overline{a_0} \overline{b_2} b_0 + \overline{a_2} a_1 \overline{a_0} b_2 b_1 b_0 + a_2 a_1 \overline{a_0} \overline{b_2} b_1 \overline{b_0} +$$
$$a_3 \overline{a_2} a_1 a_0 \overline{b_3} \overline{b_2} b_1 b_0 + \overline{a_3} a_2 a_1 a_0 \overline{b_3} b_2 b_1 b_0 + \overline{a_3} a_2 a_0 \overline{b_3} b_1 \overline{b_0} +$$
$$\overline{a_3} a_1 \overline{a_0} \overline{b_3} b_2 b_0 + a_2 \overline{a_1} \overline{a_0} b_1 \overline{b_0} + a_1 \overline{a_0} b_2 b_1 \overline{b_0} + a_3 a_1 b_3 b_2 b_1 b_0 +$$
$$a_3 a_2 a_1 a_0 \overline{b_3} b_1 + \overline{a_3} a_2 b_3 b_2 b_1 b_0 + a_3 a_2 a_1 a_0 \overline{b_3} b_2 +$$
$$\overline{a_3} \overline{a_2} a_1 \overline{b_3} b_2 \overline{b_1} + \overline{a_3} a_2 \overline{a_1} a_0 \overline{b_3} b_2 b_1 + a_3 a_2 a_1 a_0 b_3 b_2 b_1 b_0 +$$
$$a_3 a_2 a_1 b_3 b_2 b_1 b_0{}^* + a_3 a_1 \overline{a_0} \overline{b_1} b_0 + a_1 a_0 b_3 b_1 b_0 +$$
$$a_3 a_2 a_1 a_0 b_3 b_2 \overline{b_1} b_0 + a_3 a_2 \overline{a_1} a_0 b_3 \overline{b_2} b_1 b_0 + a_3 a_2 a_0 b_3 b_2 b_1 b_0 +$$
$$a_3 a_2 a_1 a_0 b_3 b_2 b_0$$

$$p^*_{8,4} = a_3 \overline{b_3} \overline{b_2} \overline{b_1} b_0 + a_3 \overline{a_2} \overline{a_1} a_0 b_3 + a_3 \overline{b_3} b_2 b_1 \overline{b_0} + a_3 a_2 a_1 a_0 b_3 +$$
$$a_3 a_2 a_1 a_0 b_2 + a_2 \overline{b_3} \overline{b_2} b_1 \overline{b_0} + a_3 a_2 b_3 \overline{b_2} b_1{}^* + a_3 a_2 a_1 b_3 b_2{}^* +$$
$$a_3 a_2 a_1 \overline{b_3} b_2 + a_3 a_2 b_3 b_2 b_1 + a_3 a_2 a_1 \overline{b_1} b_0 + a_1 a_0 b_3 b_2 b_1 +$$
$$a_3 a_1 \overline{b_3} b_2 b_1 \overline{b_0} + \overline{a_3} a_2 a_1 a_0 b_3 b_1 + a_2 a_1 b_3 \overline{b_2} b_1 b_0 +$$
$$\overline{a_3} a_2 a_1 a_0 \overline{b_2} b_1 + a_3 a_2 a_1 a_0 \overline{b_2} b_1 + a_2 a_1 b_3 \overline{b_2} b_1 b_0 +$$
$$a_3 a_2 \overline{a_1} \overline{a_0} b_1 \overline{b_0} + a_1 a_0 b_3 \overline{b_2} \overline{b_1} \overline{b_0} + a_3 \overline{a_2} \overline{a_1} a_0 b_3 b_1 +$$
$$a_3 a_1 \overline{b_3} \overline{b_2} b_1 b_0 + a_3 a_2 \overline{a_1} b_3 b_1 \overline{b_0} + a_3 a_1 a_0 b_3 b_2 \overline{b_1} +$$
$$a_2 \overline{a_1} \overline{a_0} \overline{b_3} b_1 \overline{b_0} + a_3 a_2 \overline{a_1} b_3 b_2 \overline{b_1} + a_3 a_2 a_1 b_3 b_2 b_0 +$$
$$\overline{a_3} a_2 \overline{a_0} b_3 b_2 b_1 + a_3 a_2 a_0 b_3 b_2 \overline{b_1}{}^* + a_3 a_2 \overline{a_1} b_3 b_2 b_0{}^* +$$
$$a_3 a_1 \overline{a_0} \overline{b_3} b_2 b_1{}^* + \overline{a_3} a_2 a_1 b_3 b_1 \overline{b_0}{}^* + a_3 a_2 a_1 b_3 b_2 b_1 b_0 +$$
$$a_3 a_2 \overline{a_1} \overline{a_0} b_3 \overline{b_2} b_1 + a_3 a_2 a_1 a_0 b_3 b_2 \overline{b_1} + a_3 a_2 a_1 b_3 b_2 b_1 b_0 +$$
$$\overline{a_3} a_2 a_1 a_0 b_2 b_1 b_0{}^*$$

$$p^*_{8,5} = a_3 \overline{b_3} \overline{b_2} b_0 + \overline{a_3} \overline{a_2} a_0 b_3 + a_3 \overline{b_3} b_2 b_1 + a_3 a_2 a_1 b_3 +$$
$$a_3 \overline{b_3} b_2 b_1 \overline{b_0} + \overline{a_3} a_2 \overline{a_1} a_0 b_3 + a_3 a_2 b_3 b_2 + a_3 a_2 b_3 b_2 +$$
$$a_3 a_1 a_0 b_3 b_2 b_0{}^* + \overline{a_3} a_2 a_0 b_3 b_1 b_0{}^* + a_3 a_2 a_1 b_3 b_1 +$$
$$a_3 a_1 b_3 b_2 b_1 + a_3 \overline{a_2} a_1 a_0 b_3 b_2 + a_3 a_2 b_3 b_2 b_1 b_0 +$$
$$a_2 a_1 b_3 b_2 b_1 + a_3 a_2 a_1 b_2 b_1 + a_3 a_2 a_1 b_2 b_1{}^* +$$
$$a_3 a_2 a_1 a_0 b_2 b_0{}^* + a_2 a_0 b_3 b_2 b_1 b_0{}^* + a_3 a_2 a_1 a_0 b_2 b_1 b_0 +$$
$$a_2 a_1 a_0 b_3 b_2 b_1 b_0 + a_3 a_2 a_0 b_2 b_1 b_0{}^*$$

$$p^*_{8,6} = a_3 b_3 b_2 + a_3 b_3 b_1 + a_3 b_3 b_0 + a_3 a_2 b_3 + a_3 a_1 b_3 + a_3 a_0 b_3 +$$
$$a_3 a_2 a_1 a_0 b_3 b_2 b_1 b_0$$

$$p^*_{8,7} = a_3 b_3 b_2 + a_3 b_3 b_1 + a_3 b_3 b_0 + a_3 a_2 b_3 + a_3 a_1 b_3 + a_3 a_0 b_3$$

where, $a_3$, $a_2$, $a_1$ and $a_0$ represent input bits of the first operand, $b_3$, $b_2$, $b_1$ and $b_0$ represent input bits for the second operand, and $p_{8,i}$ represents product bits for an 8-bit product where $i$ represents the specific product bit.

6. The multiplier according to claim 1, wherein the multiplier is an unsigned multiplier.

7. The multiplier according to claim 6, wherein the multiplier is a 4-bit by 4-bit multiplier and the Boolean expressions for the product bits are as follows:

$$p_0 = a_0 b_0$$

$$p_1 = a_0 b_1 \oplus a_1 b_0$$

$$p_2 = a_2 a_1 \overline{a_0} b_0 + a_0 b_2 \overline{b_1 b_0} + a_2 \overline{b_2 b_1} b_0 + \overline{a_2} a_1 a_0 b_2 + a_2 a_0 \overline{b_2} b_0 +$$
$$a_2 a_0 b_2 b_0 + a_2 a_1 a_0 b_1 + a_1 \overline{b_2} b_1 b_0 + a_1 \overline{a_0} b_1 b_0 +$$
$$a_2 a_1 a_0 b_2 b_0^* + a_2 a_0 b_2 b_1 b_0^*$$

$$p_3 = a_3 b_3 b_2 b_1 b_0 + a_3 a_2 a_1 a_0 b_3 + a_2 \overline{b_3 b_2} b_1 \overline{b_0} + a_3 a_2 a_1 \overline{a_0} b_2 +$$
$$a_3 a_0 b_3 \overline{b_2} b_1 + a_3 a_2 a_1 b_3 b_0 + a_0 b_3 b_2 \overline{b_1} b_0 + a_3 a_2 \overline{a_1 a_0} b_0 +$$
$$a_1 \overline{b_3} b_2 b_1 b_0 + a_3 a_2 a_1 a_0 b_1 + a_3 a_2 a_0 b_3 b_2 b_1 + a_3 a_2 a_1 \overline{b_3} b_2 b_0 +$$
$$a_2 a_0 b_3 b_1 b_0 + a_3 a_1 a_0 b_2 b_0 + a_2 a_1 a_0 b_3 b_1 \overline{b_0} + a_2 a_1 a_0 b_2 b_1 b_0 +$$
$$a_3 a_2 a_1 a_0 b_3 b_2 b_1 b_0 + a_3 a_2 a_1 a_0 b_3 b_2 b_1 b_0 + a_3 a_2 a_0 \overline{b_3} b_1 b_0 +$$
$$a_3 a_1 \overline{a_0} b_3 b_2 b_0 + a_2 a_1 a_0 b_1 \overline{b_0} + a_1 \overline{a_0} b_2 b_1 b_0 + a_3 a_1 b_3 b_2 b_1 b_0 +$$
$$a_3 a_2 a_1 a_0 b_3 \overline{b_1} + \overline{a_3} a_2 b_3 b_2 b_1 b_0 + a_3 a_2 a_1 a_0 b_3 b_2 +$$
$$a_3 \overline{a_2} a_1 b_3 b_2 b_1 + a_3 a_2 a_1 b_3 b_2 b_1 + a_3 a_2 a_1 a_0 b_3 b_2 \overline{b_1} b_0 +$$
$$a_3 a_2 a_1 b_3 b_2 b_1^* + a_3 \overline{a_1 a_0} \overline{b_1} b_0 + a_1 a_0 b_3 b_1 \overline{b_0} +$$
$$a_3 a_2 a_1 a_0 b_3 b_2 b_1 b_0 + a_3 a_2 a_1 a_0 b_3 b_2 b_1 b_0 + a_3 \overline{a_2} a_0 \overline{b_3} b_2 b_1 b_0 +$$
$$a_3 a_2 a_1 a_0 b_3 \overline{b_2} b_0$$

$$p_{8,4} = \overline{a_3} a_2 a_1 a_0 b_3 b_2 b_1 + a_3 a_2 a_1 b_3 b_2 b_1 b_0 + a_3 \overline{a_2} a_1 \overline{a_0} b_3 +$$
$$a_3 b_3 b_2 b_1 b_0 + a_3 a_1 b_3 \overline{b_2 b_1} + a_3 a_2 \overline{a_1} b_3 b_1 + a_2 b_3 b_2 b_1 b_0 +$$
$$\overline{a_3} a_2 a_1 \overline{a_0} b_2 + a_3 a_2 a_1 a_0 b_1 + a_1 b_3 b_2 b_1 b_0 + a_3 a_2 \overline{a_1} b_1 b_0 +$$
$$a_1 a_0 b_3 b_2 \overline{b_1} + a_3 a_2 a_1 \overline{b_3} b_2 b_1 b_0 + a_3 a_2 a_1 a_0 b_3 b_2 b_1 +$$
$$a_2 \overline{a_1} b_2 b_1 \overline{b_0} + a_2 a_1 a_0 b_2 b_1 + a_3 a_0 b_3 b_2 b_1 b_0 + a_3 a_2 a_1 a_0 b_3 b_0 +$$
$$a_3 a_2 a_1 a_0 b_3 b_0 + a_3 a_0 b_3 b_2 b_1 b_0 + a_3 a_2 a_1 a_0 b_3 \overline{b_1} b_0 +$$
$$a_3 a_1 a_0 b_3 b_2 b_1 b_0 + a_3 a_2 a_0 \overline{b_3 b_2} b_1 + a_3 a_2 a_1 b_3 b_2 b_0 +$$
$$a_3 a_1 a_0 b_3 b_1 b_0 + a_3 a_1 a_0 b_3 b_1 b_0 + a_3 a_2 a_1 a_0 b_3 b_2 b_1 +$$
$$a_3 a_2 a_1 b_3 b_2 b_1 b_0 + a_3 a_2 a_1 a_0 b_3 b_2 b_1 b_0 + a_3 a_2 a_1 a_0 b_3 b_2 b_1 +$$
$$a_3 a_2 a_1 a_0 b_3 b_2 b_1 b_0 + a_3 a_2 a_1 b_3 b_1 b_0 + a_3 a_1 a_0 b_3 b_2 b_1 +$$
$$a_3 a_2 a_1 a_0 b_3 b_2 b_1 b_0$$

$$p_{8,5} = a_3 a_2 a_1 a_0 b_2 + a_2 b_3 b_2 b_1 b_0 + a_3 a_2 a_1 a_0 b_3 + a_3 b_3 b_2 b_1 b_0 +$$
$$a_3 a_2 a_1 b_2 \overline{b_0} + a_2 a_0 b_3 b_2 b_1 + a_2 a_1 b_3 b_2 b_1 + a_3 a_2 a_1 b_2 b_1 +$$
$$a_3 a_2 b_3 b_2 b_1 + a_3 a_2 a_1 b_3 b_2 + a_3 a_2 b_3 b_2 b_1 + a_3 a_2 a_1 b_3 b_2 +$$
$$a_3 a_2 b_3 b_2 b_1 b_0 + a_3 a_2 a_1 a_0 b_3 b_2 + a_3 a_2 a_0 b_3 b_2 b_0 +$$
$$a_3 a_2 a_0 b_3 b_2 b_0 + a_3 a_1 a_0 b_3 b_2 b_1 + a_3 a_2 a_1 b_3 b_1 b_0 +$$
$$a_3 a_2 a_1 b_3 b_2 + a_3 a_2 a_1 b_3 b_2 b_1 + a_3 a_2 a_1 b_3 b_1 b_0 +$$
$$a_3 a_1 a_0 b_3 b_1 + a_3 a_1 a_0 b_3 b_1 b_0 + a_3 a_2 a_1 b_2 b_1 b_0 +$$
$$a_2 a_1 a_0 b_3 b_2 b_1 + a_3 a_1 a_0 b_3 b_2 b_1 b_0 + a_2 a_1 a_0 b_3 b_1 b_0 +$$

$$a_3 a_1 a_0 \overline{b_2} b_1 b_0 + \overline{a_2} a_1 a_0 b_3 b_1 b_0 + a_3 a_2 \overline{a_1} a_0 b_3 \overline{b_1} b_0^* +$$
$$a_3 a_2 a_0 b_3 \overline{b_2} b_1 b_0 + a_3 \overline{a_2} a_1 a_0 b_3 b_2 b_0 + a_3 a_2 a_1 a_0 b_3 b_2 b_1 +$$
$$a_3 a_2 \overline{a_1} b_3 b_2 b_1 \overline{b_0} + a_3 a_2 a_0 b_3 b_2 b_1 b_0 + \overline{a_3} a_2 a_1 a_0 \overline{b_3} b_2 b_0$$

$$p_{8,6} = a_3 a_2 b_3 \overline{b_2} + a_3 b_3 \overline{b_2 b_1 b_0} + a_3 a_2 \overline{a_1} \overline{a_0} b_3 + a_3 a_1 b_3 b_2 b_1 +$$
$$a_3 \overline{a_2 a_1} b_3 b_1 + a_3 \overline{a_2 a_1} b_3 \overline{b_0} + a_3 \overline{a_0} b_3 \overline{b_2 b_1} + a_3 a_2 \overline{b_3} b_2 b_1 +$$
$$\overline{a_3} a_2 a_1 b_3 b_2 + a_3 a_2 a_1 b_2 b_1^* + a_3 a_1 a_0 b_3 \overline{b_2} b_0 +$$
$$a_3 \overline{a_2 a_0} b_3 b_1 b_0 + a_3 a_2 a_1 a_0 b_3 b_1 +$$
$$a_3 a_1 b_3 b_2 b_1 b_0 + a_3 a_1 a_0 b_3 b_2 b_1 + \overline{a_3} a_2 a_1 b_3 b_1 b_0 +$$
$$a_3 a_2 a_1 \overline{b_3} b_2 b_0 + a_3 a_2 a_0 b_3 b_2 b_1 + a_3 a_2 a_1 a_0 b_2 b_0 +$$
$$a_2 a_0 b_3 b_2 b_1 b_0 + a_3 a_2 a_0 b_3 b_2 b_0 + a_3 a_2 a_0 b_3 b_2 b_0$$

$$p_{8,7} = a_3 a_2 a_0 b_3 b_1 + a_3 a_1 b_3 b_2 b_0 + a_3 a_2 a_1 b_3 b_1 + a_3 a_1 b_3 b_2 b_1 +$$
$$a_3 a_2 b_3 b_2 + a_3 a_2 b_3 b_1 b_0 + a_3 a_1 a_0 b_3 b_2 + a_3 a_0 b_3 b_2 b_1 b_0 +$$
$$a_3 a_2 a_1 a_0 b_3 b_0$$

where, $a_3$, $a_2$, $a_1$ and $a_0$ represent input bits of operand A, $b_3$, $b_2$, $b_1$ and $b_0$ represent input bits of operand B, and $p_{8,i}$ represents product bits for an 8-bit product wherein $i$ represents the specific product bit.

8. The multiplier according to claim 1, wherein a most significant product bit of a n-bit by n-bit two's complement multiplier is expressed as:

$$p'_{2n,2n-1} = a_{n-1} \overline{b_{n-1}} (b_{n-2} + b_{n-3} + \ldots + b_1 + b_0) + \overline{a_{n-1}} b_{n-1} (a_{n-2} + a_{n-3} + \ldots + a_1 + a_0)$$

where, $a_{n-1}$, $a_{n-2}$, ..., $a_0$ represent input bits for operand A;

$b_{n-1}$, $b_{n-2}$, ..., $b_0$ represent input bits for operand B; and $p'_{2n, 2n-1}$ represents the most significant product bit for a 2n-bit multiplier product.

9. The multiplier according to claim 8, wherein a next most significant product bit of n-bit by n-bit two's complement multiplier is expressed as:

$$p'_{2n,2n-2} = p'_{2n,2n-1} + a_{n-1} a_{n-2} a_{n-3} \ldots a_1 a_0 \overline{b_{n-1} b_{n-2} b_{n-3} \ldots b_1 b_0}$$

where, $a_{n-1}$, $a_{n-2}$, ..., $a_0$ represent input bits for the first operand;

$b_{n-1}$, $b_{n-2}$, ..., $b_0$ represent input bits for the second operand; and $p'_{2n, 2n-2}$ represents the next most significant product bit for a 2n-bit multiplier product.

10. The multiplier according to claim 1, wherein a next most significant product bit of a n-bit by n-bit two's complement multiplier is expressed as:

$$p'_{2n,2n-2} = a_{n-1} \overline{b_{n-1}} (b_{n-2} + b_{n-3} + \ldots + b_0) + \overline{a_{n-1}} b_{n-1} (a_{n-2} + a_{n-3} + \ldots + a_0) + a_{n-1} a_{n-2} a_{n-3} \ldots a_1 a_0 \overline{b_{n-1} b_{n-2} b_{n-3} \ldots b_1 b_0}$$

where, $a_{n-1}$, $a_{n-2}$, ..., $a_0$ represent input bits for the first operand;

$b_{n-1}$, $b_{n-2}$, ..., $b_0$ represent input bits for the second operand; and $p'_{2n, 2n-2}$ represents the next most significant product bit for a 2n-bit multiplier product.

11. The multiplier according to claim 1, wherein the multiplier includes two logical gate delays at most.

12. A method for binary multiplication in a Boolean multiplier employing only two logic gate delays, comprising the steps of:
   inputting bits representing a first operand and a second operand,
   combining the bits representing the first operand and the second operand with Boolean functions to create logical products,
   combining the logical products with Boolean functions to produce specific product bits, and
   wherein partial products are not generated during the binary multiplication.

13. The method according to claim 12, wherein a first set of NAND gates combine the first operand and the second operand and a second set of NAND gates combine the logical products.

14. The method according to claim 12, wherein a set of AND gates combine the first operand and the second operand and a set of OR gates combine the logical products.

15. The method according to claim 12, wherein the multiplier is a two's complement multiplier.

16. The method according to claim 15, wherein the multiplier is a 4-bit by 4-bit multiplier and the Boolean expressions for the product bits are as follows:

$$p_0 = a_0 b_0$$

$$p_1 = a_0 b_1 \oplus a_1 b_0$$

$$p_2 = a_2 a_1 a_0 b_0 + a_0 b_2 b_1 b_0 + a_2 b_2 b_1 b_0 + a_2 a_1 a_0 b_2 + a_2 a_0 \overline{b_2} b_0 + \\ a_2 a_0 b_2 b_0 + a_2 \overline{a_1} a_0 b_1 + a_1 b_2 b_1 \overline{b_0} + a_1 a_0 b_1 b_0 + \\ a_2 \overline{a_1} a_0 b_2 \overline{b_0}^* + a_2 a_0 b_2 \overline{b_1} b_0^*$$

$$p_3 = a_3 \overline{b_3} \overline{b_2} b_1 b_0 + a_3 \overline{a_2} a_1 a_0 b_3 + a_2 \overline{b_3} b_2 b_1 \overline{b_0} + \overline{a_3} \overline{a_2} a_1 a_0 \overline{b_2} + \\ a_3 a_0 b_3 \overline{b_2} \overline{b_1} + a_3 a_2 a_1 \overline{b_3} b_0 + a_0 b_3 \overline{b_2} \overline{b_1} b_0 + a_3 \overline{a_2} \overline{a_1} \overline{a_0} b_0 + \\ a_1 b_3 b_2 b_1 \overline{b_0} + a_3 \overline{a_2} \overline{a_1} a_0 b_1 + a_3 a_2 a_0 b_3 b_2 b_1 + a_3 a_2 a_1 b_3 b_2 b_0 + \\ a_2 a_0 b_3 b_1 \overline{b_0} + a_3 a_1 a_0 b_2 b_0 + a_2 a_1 a_0 b_2 b_1 b_0 + a_2 a_1 a_0 \overline{b_2} b_1 \overline{b_0} + \\ a_3 a_2 a_1 a_0 b_3 b_2 b_1 b_0 + a_3 \overline{a_2} a_1 a_0 \overline{b_3} \overline{b_2} b_1 b_0 + a_3 a_2 a_0 \overline{b_3} b_1 b_0 + \\ a_3 a_1 a_0 b_3 b_2 b_0 + a_2 \overline{a_1} a_0 b_1 \overline{b_0} + a_1 a_0 b_2 b_1 \overline{b_0} + a_3 a_1 b_3 b_2 b_1 b_0 + \\ a_3 a_2 a_1 a_0 b_3 b_1 + a_3 a_2 b_3 b_2 b_1 b_0 + a_3 a_2 a_1 a_0 \overline{b_3} b_2 + \\ a_3 a_2 a_1 b_3 b_2 b_1 + a_3 a_2 a_1 \overline{b_3} b_2 b_1 + a_3 a_2 a_1 a_0 b_3 b_2 b_1 b_0 + \\ a_3 a_2 a_1 b_3 b_2 b_1 \overline{b_0}^* + a_3 a_1 a_0 b_1 b_0 + a_1 a_0 b_3 b_1 b_0 + \\ a_3 a_2 a_1 a_0 b_3 b_2 b_1 b_0 + a_3 a_2 a_1 a_0 b_3 b_2 b_1 b_0 + a_3 a_2 a_0 b_3 b_2 b_1 b_0 + \\ a_3 a_2 a_1 a_0 b_3 b_2 b_0$$

$$p^*_{8,4} = a_3 b_3 b_2 b_1 b_0 + a_3 a_2 a_1 a_0 b_3 + a_3 b_3 b_2 b_1 b_0 + a_3 a_2 a_1 a_0 b_3 + \\ a_3 a_2 a_1 a_0 b_2 + a_2 b_3 b_2 b_1 b_0 + a_3 a_2 b_3 b_2 b_1^* + a_3 a_2 a_1 b_3 b_2^* + \\ a_3 a_2 a_1 b_3 b_2 + a_3 a_2 b_3 b_2 b_1 + a_3 a_2 a_1 b_1 b_0 + a_1 a_0 b_3 b_2 b_1 + \\ a_3 a_1 b_3 b_2 b_1 b_0 + a_3 a_2 a_1 a_0 b_3 b_1 + a_2 a_1 b_3 b_2 b_1 b_0 + \\ a_3 a_2 a_1 a_0 b_2 b_1 + a_3 a_2 a_1 a_0 b_2 b_1 + a_2 a_1 b_3 b_2 b_1 b_0 +$$

-continued $$a_3 \overline{a_2} \overline{a_1} \overline{a_0} b_1 \overline{b_0} + a_1 \overline{a_0} b_3 b_2 b_1 \overline{b_0} + a_3 \overline{a_2} \overline{a_1} a_0 b_3 \overline{b_1} + \\ a_3 \overline{a_1} b_3 \overline{b_2} b_1 b_0 + a_3 \overline{a_2} \overline{a_1} b_3 b_1 \overline{b_0} + \overline{a_3} a_1 \overline{a_0} b_3 b_2 b_1 + \\ a_2 a_1 a_0 b_2 b_1 \overline{b_0} + a_3 a_2 \overline{a_1} b_3 b_2 \overline{b_1} + a_3 a_2 a_1 b_3 b_2 b_0 + \\ \overline{a_3} a_2 \overline{a_0} b_3 b_2 b_1 + a_3 a_2 a_0 b_3 b_2 b_1^* + a_3 a_2 \overline{a_1} b_3 b_2 b_0^* + \\ a_3 a_1 \overline{a_0} b_3 b_2 b_1^* + \overline{a_3} a_2 a_1 b_3 b_1 \overline{b_0}^* + a_3 \overline{a_2} a_1 b_3 b_2 b_1 b_0 + \\ a_3 \overline{a_2} a_1 \overline{a_0} b_3 \overline{b_2} b_1 + a_3 \overline{a_2} a_1 a_0 b_3 b_2 \overline{b_1} + a_3 a_2 \overline{a_1} b_3 \overline{b_2} b_1 \overline{b_0} + \\ \overline{a_3} a_2 a_1 a_0 b_2 b_1 b_0^*$$

$$p^*_{8,5} = a_3 \overline{b_3} \overline{b_2} b_0 + \overline{a_3} a_2 a_0 b_3 + a_3 \overline{b_3} \overline{b_2} b_1 + \overline{a_3} a_2 a_1 b_3 + \\ a_3 \overline{b_3} b_2 \overline{b_1} b_0 + \overline{a_3} a_2 a_1 a_0 b_3 + a_3 a_2 \overline{b_3} b_2 + a_3 a_2 b_3 b_2 + \\ a_3 a_1 a_0 b_3 b_2 \overline{b_0}^* + \overline{a_3} a_2 \overline{a_0} b_3 b_1 b_0^* + a_3 a_2 a_1 b_3 b_1 + \\ a_3 a_1 b_3 b_2 \overline{b_1} + a_3 \overline{a_2} a_1 a_0 b_3 \overline{b_2} + a_3 a_2 b_3 b_2 b_1 b_0 + \\ a_2 a_1 b_3 b_2 \overline{b_1} + a_3 \overline{a_2} \overline{a_1} b_2 b_1 + \overline{a_3} a_2 a_1 b_2 b_1^* + \\ \overline{a_3} a_2 a_1 a_0 b_2 b_0^* + a_2 a_0 b_3 b_2 b_1 b_0^* + a_3 a_2 a_1 a_0 b_2 b_1 b_0 + \\ a_2 \overline{a_1} a_0 b_3 b_2 b_1 b_0 + a_3 a_2 a_0 b_2 b_1 b_0^*$$

$$p^*_{8,6} = a_3 \overline{b_3} b_2 + a_3 \overline{b_3} b_1 + a_3 \overline{b_3} b_0 + a_3 a_2 b_3 + a_3 a_1 b_3 + \overline{a_3} a_0 b_3 + \\ a_3 \overline{a_2} \overline{a_1} a_0 b_3 b_2 b_1 b_0$$

$$p^*_{8,7} = a_3 b_3 b_2 + a_3 b_3 b_1 + a_3 b_3 b_0 + a_3 a_2 b_3 + a_3 a_1 b_3 + \overline{a_3} a_0 b_3$$

where,
   $a_3, a_2, a_1$ and $a_0$ represent input bits of the first operand,
   $b_3, b_2, b_1$ and $b_0$ represent input bits of the second operand, and
   $p^*_{8,i}$ represents product bits for an 8-bit product where i represents the specific product bit.

17. The method according to claim 12, wherein the multiplier is an unsigned multiplier.

18. The method according to claim 17, wherein the multiplier is a 4-bit by 4-bit multiplier and the Boolean expressions for the products are as follows:

$$p_0 = a_0 b_0$$

$$p_1 = a_0 b_1 \oplus a_1 b_0$$

$$p_2 = a_2 a_1 a_0 b_0 + a_0 b_2 b_1 b_0 + a_2 b_2 b_1 b_0 + a_2 a_1 a_0 b_2 + a_2 a_0 \overline{b_2} b_0 + \\ a_2 a_0 b_2 b_0 + a_2 \overline{a_1} a_0 b_1 + a_1 b_2 b_1 b_0 + a_1 a_0 b_1 b_0 + \\ a_2 \overline{a_1} a_0 b_2 \overline{b_0}^* + a_2 a_0 b_2 \overline{b_1} b_0^*$$

$$p_3 = a_3 b_3 b_2 b_1 b_0 + a_3 a_2 a_1 a_0 b_3 + a_2 b_3 b_2 b_1 b_0 + a_3 a_2 a_1 a_0 b_2 + \\ a_3 a_0 b_3 b_2 b_1 + a_3 a_2 a_1 b_3 b_0 + a_0 b_3 b_2 b_1 b_0 + a_3 a_2 a_1 a_0 b_0 + \\ a_1 b_3 b_2 b_1 b_0 + a_3 a_2 a_1 a_0 b_1 + a_3 a_2 a_0 b_3 b_2 b_1 + a_3 a_2 a_1 b_3 b_2 b_0 + \\ a_2 a_0 b_3 b_1 b_0 + a_3 a_1 a_0 b_2 b_0 + a_2 a_1 a_0 b_2 b_1 b_0 + a_2 a_1 a_0 b_2 b_1 b_0 + \\ a_3 a_2 a_1 a_0 b_3 b_2 b_1 b_0 + a_3 a_2 a_1 a_0 b_3 b_2 b_1 b_0 + a_3 a_2 a_0 b_3 b_1 b_0 +$$

-continued $$a_3a_1a_0b_3b_2b_0 + a_2\overline{a_1a_0}b_1\overline{b_0} + a_1a_0b_2b_1\overline{b_0} + a_3a_1b_3b_2b_1b_0 +$$
$$a_3a_2a_1a_0\overline{b_3}b_1 + a_3a_2b_3b_2b_1b_0 + a_3a_2a_1a_0b_3b_2 +$$
$$\overline{a_3}\overline{a_2}a_1\overline{b_3}b_2\overline{b_1} + \overline{a_3}a_2\overline{a_1}b_3b_2b_1 + a_3a_2a_1a_0b_3b_2\overline{b_1}b_0 +$$
$$a_3a_2\overline{a_1}b_3b_2\overline{b_1}b_0^* + a_3\overline{a_1}a_0b_1\overline{b_0} + a_1a_0b_3\overline{b_1}\overline{b_0} +$$
$$a_3\overline{a_2}a_1a_0b_3b_2\overline{b_1}b_0 + a_3a_2\overline{a_1}a_0b_3\overline{b_2}b_1b_0 + a_3\overline{a_2}a_0\overline{b_3}b_2b_1b_0 +$$
$$\overline{a_3}a_2a_1a_0b_3\overline{b_2}b_0$$

$$p_{8,4} = a_3\overline{a_2}a_1a_0\overline{b_3}b_2b_1 + \overline{a_3}a_2a_1\overline{b_3}b_2b_1b_0 + \overline{a_3}\overline{a_2}a_1\overline{a_0}b_3 +$$
$$a_3b_3\overline{b_2}b_1b_0 + \overline{a_3}a_1b_3\overline{b_2}b_1 + a_3a_2\overline{a_1}\overline{b_3}b_1 + a_2b_2b_2b_1\overline{b_0} +$$
$$a_3a_2a_1a_0b_2 + a_3a_2\overline{a_1a_0}b_1 + a_1b_3\overline{b_2}b_1\overline{b_0} + a_3a_2\overline{a_1}b_1\overline{b_0} +$$
$$a_1\overline{a_0}b_3\overline{b_2}\overline{b_1} + a_3a_2\overline{a_1}\overline{b_3}b_2b_1b_0 + a_3a_2a_1a_0b_3b_2\overline{b_1} +$$
$$a_2a_1b_2b_1b_0 + a_2a_1a_0b_2\overline{b_1} + a_3a_0b_3b_2b_1b_0 + a_3a_2a_1a_0b_3\overline{b_0} +$$
$$a_3a_2a_1a_0b_3b_0 + a_3a_0b_3b_2b_1b_0 + a_3a_2a_1a_0b_3\overline{b_1}b_0 +$$
$$a_3a_1a_0b_3b_2b_1\overline{b_0} + a_3\overline{a_2}a_0b_3b_2b_1 + a_3a_2a_1b_3\overline{b_2}\overline{b_0} +$$
$$a_3a_1a_0b_3b_1\overline{b_0} + a_3a_1\overline{a_0}b_3b_1b_0 + a_3a_2a_1a_0b_3b_2b_1 +$$
$$a_3a_2a_1b_3b_2b_1b_0 + a_3a_2\overline{a_1}a_0b_3b_2b_1b_0 + a_3a_2a_1a_0b_3b_2\overline{b_1}\overline{b_0} +$$
$$a_3a_2a_1a_0\overline{b_3}b_2b_1b_0 + \overline{a_3}a_2\overline{a_1}b_3b_2b_1 + a_3a_2a_1\overline{a_0}b_3b_2b_1 +$$
$$\overline{a_3}a_2\overline{a_1}b_3b_2b_1\overline{b_0} + a_3a_2a_1b_3b_1b_0 + a_3a_1a_0b_3b_2b_1 +$$
$$a_3a_2a_1a_0b_3b_2b_1b_0$$

$$p_{8,5} = a_3a_2a_1a_0b_2 + a_2b_3b_2b_1b_0 + \overline{a_3}a_2a_1\overline{a_0}b_3 + a_3b_3b_2b_1b_0 +$$
$$a_3a_2\overline{a_1}b_2b_0 + a_2\overline{a_0}b_3b_2b_1 + a_2a_1b_3b_2b_1 + a_3a_2a_1b_2\overline{b_1} +$$
$$a_3a_2b_3b_2b_1 + a_3a_2a_1b_3b_2 + a_3a_2\overline{b_3}\overline{b_2}\overline{b_1} + \overline{a_3}a_2a_1b_3\overline{b_2} +$$
$$a_3a_2b_3\overline{b_2}b_1b_0 + \overline{a_3}a_2a_1a_0b_3b_2 + a_3a_2a_0b_3\overline{b_2}\overline{b_0} +$$
$$a_3a_2a_0\overline{b_3}b_2\overline{b_0} + a_3a_1\overline{a_0}b_3b_2\overline{b_1} + \overline{a_3}a_2a_1b_3b_1b_0 +$$
$$a_3a_2a_1b_3b_2b_1 + a_3\overline{a_2}a_1b_3b_2b_1 + a_3a_2a_1b_3b_1b_0 +$$
$$a_3a_1a_0b_3b_2b_1 + a_3a_1a_0b_3b_1b_0 + a_3a_2a_1b_2\overline{b_1}\overline{b_0} +$$
$$a_2a_1a_0b_3b_2b_1 + a_3a_1a_0b_3b_2\overline{b_0} + a_2\overline{a_1}a_0b_3b_1\overline{b_0} +$$
$$a_3a_1a_0b_2b_1b_0 + \overline{a_2}a_1a_0b_3b_1b_0 + a_3a_2a_1a_0b_3b_1b_0^* +$$
$$a_3a_2a_0b_3b_2b_1b_0 + a_3\overline{a_2}a_1a_0b_3b_2b_0 + a_3a_2a_1a_0b_3b_2b_1 +$$
$$a_3a_2a_1b_3b_2b_1\overline{b_0} + a_3a_2a_0b_3b_2b_1b_0 + a_3a_2a_1a_0b_3b_2b_0$$

$$p_{8,6} = a_3\overline{a_2}b_3\overline{b_2} + a_3b_3\overline{b_2}b_1\overline{b_0} + a_3a_2a_1a_0b_3 + a_3a_1b_3b_2b_1 +$$

-continued $$a_3\overline{a_2}\overline{a_1}b_3\overline{b_1} + a_3\overline{a_2}\overline{a_1}b_3b_0 + a_3\overline{a_0}b_3b_2\overline{b_1} + a_3a_2b_3b_2b_1 +$$
$$\overline{a_3}a_2a_1b_3b_2 + a_3a_2a_1b_2b_1^* + a_3\overline{a_1}\overline{a_0}b_3\overline{b_2}b_0 +$$
$$a_3a_2a_0b_3\overline{b_1}\overline{b_0} + a_3a_2a_1a_0b_3b_1 +$$
$$a_3a_1\overline{b_3}b_2b_1b_0 + a_3a_1a_0\overline{b_3}b_2b_1 + a_3a_2a_1b_3b_1b_0 +$$
$$a_3a_2a_1\overline{b_3}b_2b_0 + \overline{a_3}a_2a_0b_3b_2b_1 + a_3a_2a_1a_0b_2b_0 +$$
$$a_2a_0b_3b_2b_1b_0 + a_3a_2a_0b_3b_2b_0 + \overline{a_3}a_2a_0b_3b_2b_0$$

$$p_{8,7} = a_3a_2a_0b_3b_1 + a_3a_1b_3b_2b_0 + a_3a_2a_1b_3b_1 + a_3a_1b_3b_2b_1 +$$
$$a_3a_2b_3b_2 + a_3a_2b_3b_1b_0 + a_3a_1a_0b_3b_2 + a_3a_0b_3b_2b_1b_0 +$$
$$a_3a_2a_1a_0b_3b_0$$

where, $a_3$, $a_2$, $a_1$ and $a_0$ represent input bits of the first operand, $b_3$, $b_2$, $b_1$ and $b_0$ represent input bits of the second operand, and $p_{8,i}$ represents product bits for an 8-bit product where i represents the specific product bit.

19. The method according to claim 12, wherein a most significant product bit of an n-bit by n-bit two's complement multiplier is expressed as:

$$p'_{2n,2n-1} = \overline{a_{n-1}b_{n-1}}(b_{n-2}+b_{n-3}+\ldots+b_1+b_0)+a_{n-1}b_{n-1}(a_{n-2}+a_{n-3}+\ldots+a_1+a_0)$$

where, $a_{n-1}$, $a_{n-2}$, ... $a_0$ represent input bits for the first operand;

$b_{n-1}$, $b_{n-2}$, ... $b_0$ represent input bits for the second operand; and $p'_{2n, 2n-1}$ represents the most significant product bit for a 2n-bit multiplier product.

20. The method according to claim 19, wherein a next most significant product bit of a n-bit by n-bit two's complement multiplier is expressed as:

where, $a_{n-1}$, $a_{n-2}$, ... $a_0$ represent input bits for the first operand;

$b_{n-1}$, $b_{n-2}$, ... $b_0$ represent input bits for the second operand; and $p^-_{2n, 2n-2}$ represents the next most significant product bit for a 2n-bit multiplier product.1.

* * * * *